(12) United States Patent
Park et al.

(10) Patent No.: US 10,542,479 B2
(45) Date of Patent: Jan. 21, 2020

(54) TWO-STEP SEARCH PROCEDURE FOR D2D COMMUNICATION

(71) Applicant: Samsung Electronics Co., Ltd., Suwon-si, Gyeonggi-do (KR)

(72) Inventors: Seung-Hoon Park, Seoul (KR); Hyun-Seok Ryu, Yongin-si (KR); Anil Agiwal, Suwon-si (KR); Young-Bin Chang, Anyang-si (KR); Kyung-Kyu Kim, Suwon-si (KR); Sang-Kyu Baek, Suwon-si (KR); Chi-Woo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 15/032,234

(22) PCT Filed: Oct. 31, 2014

(86) PCT No.: PCT/KR2014/010320
§ 371 (c)(1),
(2) Date: Apr. 26, 2016

(87) PCT Pub. No.: WO2015/065073
PCT Pub. Date: May 7, 2015

(65) Prior Publication Data
US 2016/0262085 A1 Sep. 8, 2016

(30) Foreign Application Priority Data

Nov. 1, 2013 (KR) .................... 10-2013-0132506

(51) Int. Cl.
*H04W 40/24* (2009.01)
*H04H 20/38* (2008.01)
(Continued)

(52) U.S. Cl.
CPC .......... *H04W 40/246* (2013.01); *H04H 20/38* (2013.01); *H04L 67/303* (2013.01); *H04W 72/1215* (2013.01); *H04W 88/06* (2013.01)

(58) Field of Classification Search
CPC .......... H04W 40/246; H04W 72/1215; H04W 8/005; H04W 76/023; H04W 48/16; H04W 88/06; H04H 20/38; H04L 67/303
See application file for complete search history.

(56) References Cited

U.S. PATENT DOCUMENTS

2005/0047362 A1* 3/2005 Harris .................... H04M 1/578
370/328
2008/0268842 A1* 10/2008 Herrero-Veron ........ H04W 8/06
455/435.1
(Continued)

FOREIGN PATENT DOCUMENTS

GB 2499411 A 8/2013
KR 10-2013-0018144 A 2/2013
(Continued)

OTHER PUBLICATIONS

3GPP TR 23.703 V0.5.0 (Jul. 2013); 3rd Generation Partnership Project; Technical Specification Group Services and system Aspects; Study on architecture enhancements to support Proximity Services (ProSe) (Release 12).*
(Continued)

*Primary Examiner* — Alex Skripnikov
*Assistant Examiner* — Sharmin Chowdhury
(74) *Attorney, Agent, or Firm* — Jefferson IP Law, LLP

(57) ABSTRACT

The present invention relates to a two-step search procedure for D2D communication. A method for D2D communication includes: obtaining a discovery code and a multicast identifier to be used for transmitting additional information on an application program through a D2D multicast subframe, based on an identifier of an application program of a device;
(Continued)

and broadcasting the discovery code and the multicast identifier in a discovery subframe.

20 Claims, 30 Drawing Sheets

(51) Int. Cl.
*H04L 29/08* (2006.01)
*H04W 72/12* (2009.01)
*H04W 88/06* (2009.01)

(56) References Cited

U.S. PATENT DOCUMENTS

| | | |
|---|---|---|
| 2012/0011247 A1 | 1/2012 | Mallik et al. |
| 2013/0039440 A1 | 2/2013 | Lim et al. |
| 2013/0064138 A1 | 3/2013 | Hakola et al. |
| 2013/0114531 A1 | 5/2013 | Ahn et al. |
| 2013/0288668 A1 | 10/2013 | Pragada et al. |
| 2014/0056220 A1* | 2/2014 | Poitau .................. H04W 76/14 370/328 |
| 2014/0094212 A1* | 4/2014 | Ahn ........................ H04W 4/70 455/517 |
| 2014/0140261 A1 | 5/2014 | Kim et al. |
| 2014/0334354 A1* | 11/2014 | Sartori .................. H04W 8/005 370/280 |
| 2015/0373510 A1* | 12/2015 | Stojanovski .......... H04W 36/14 370/312 |
| 2016/0014831 A1 | 1/2016 | Lee et al. |
| 2016/0119963 A1* | 4/2016 | Casati .................. H04W 76/14 455/434 |
| 2016/0234806 A1* | 8/2016 | Le Thierry D'Ennequin .............. H04W 4/06 |

FOREIGN PATENT DOCUMENTS

| | | |
|---|---|---|
| WO | 2013/009069 A2 | 1/2013 |
| WO | 2013/119094 A1 | 8/2013 |
| WO | 2013/154546 A1 | 10/2013 |
| WO | 2013163634 A1 | 10/2013 |

OTHER PUBLICATIONS

EP Office Action dated Oct. 11, 2018 issued in EP Application 14 858 861.9.
Korean Office Action dated Sep. 18, 2019, issued in Korean Application No. 10-2013-0132506.

* cited by examiner

TWO-STEP SEARCH PROCEDURE FOR D2D COMMUNICATION

CROSS-REFERENCE TO RELATED APPLICATION(S)

This application is a U.S. National Stage application under 35 U.S.C. § 371 of an International application filed on Oct. 31, 2014 and assigned application number PCT/KR2014/010320, which claimed the benefit of a Korean patent application filed on Nov. 1, 2013 in the Korean Intellectual Property Office and assigned Serial number 10-2013-0132506, the entire disclosure of which is hereby incorporated by reference.

TECHNICAL FIELD OF THE INVENTION

The present disclosure relates to a technology for searching for a terminal in a D2D communication system.

BACKGROUND OF THE INVENTION

Recently, due to the accelerated supply of smart phones, the amount of mobile data traffic has rapidly increased. Further, since application services such as a Social Network Service (SNS) and games using the smart phone are expected to gradually become more dynamic, the mobile data traffic will increase more and more. In order to solve a problem of a traffic overload concentrated at an evolved NodeB (eNB) or an Access Point (AP) due to the rapid increase of mobile data traffic, a Device-to-Device (hereinafter, referred to as "D2D") communication technology is spotlighted. The D2D communication refers to direct communication between adjacent User Equipments (UEs) without infrastructure configured by a centralized access point such as the eNB or the AP.

When the D2D communication technology is combined with a mobile communication system, traffic capacity of the base station may increase and overload may decrease, which is worthy of notice. That is, when UEs within the same cell or adjacent cells establish a D2D link therebetween and directly exchange data through the D2D link without passing through the eNB, there is an advantage in that two links can be reduced to one link.

Accordingly, interest in a discovery procedure for efficiently operating a process in which a plurality of UEs broadcast information on service contents around the UEs and receiving the information has rapidly increased. For example, an Over-The-Top (OTT) scheme of discovering an adjacent UE is provided by collecting application program information and service-related information from the UE based on the existing Internet network, identifying whether another UE associated with the collected information is located within a range in which a service is available, and informing each UE of a result thereof, by an Application Service Providing (ASP) server. The conventional OTT scheme spent many network resources during a process of periodically transmitting location information and user/service recognition information to a server and receiving a result from the server in order to find a relevant service based on location information of each of the UEs. Further, the OTT used a significant amount of power since the location should be recognized using an additional device such as a GPS or a short-range WLAN module in order to transmit location information of the UE to the server. In addition, the OTT has a disadvantage in that supporting a D2D communication service is difficult when the number of UEs is large or a discovery range is large since a non-licensed band is mainly used in short-range wireless communication.

SUMMARY OF THE INVENTION

Technical Problem of the Invention

Accordingly, an embodiment of the present invention provides a discovery procedure in a D2D communication system.

Another embodiment of the present invention provides a discovery procedure method and apparatus in which a UE transmits/receives higher layer service information to/from an adjacent UE through radio resources.

Another embodiment of the present invention provides a discovery procedure method and apparatus for exchanging various sizes of higher layer service information before a connection between UEs is performed.

Another embodiment of the present invention provides a discovery procedure method and apparatus for dividing a discovery step between UEs into two steps, transmitting small size discovery information in a first step, and transmitting additional discovery information, which has not been transmitted in the first step, in a second step.

Solution to Problem of the Invention

According to various embodiments of the present invention, a method of performing D2D communication by a UE includes acquiring a discovery code and a multicast ID to be used for transmitting additional information on an application program through a D2D multicast subframe based on an ID of the UE for the application program, and broadcasting the discovery code and the multicast ID in a discovery subframe.

According to various embodiments of the present invention, a method of performing D2D communication by a UE includes receiving a discovery code and a multicast ID of a transmission UE, determining whether to receive additional information of the transmission UE based on the received discovery code, and, when it is determined that reception of the additional information will take place, receiving additional information having the multicast ID received through a D2D multicast subframe.

According to various embodiments of the present invention, a method of performing D2D communication by a discovery server includes receiving an ID of a UE for an application program, determining a discovery code corresponding to the ID for the application program, and transmitting the discovery code and a multicast ID of the UE to the UE, wherein the multicast ID of the UE is used for transmitting additional information on the application program through a D2D multicast subframe.

According to various embodiments of the present invention, a method of performing D2D communication by a Mobile Management Entity (MME) includes receiving a request for transmitting a multicast ID of a UE from one of a discovery server and the UE, determining the multicast ID of the UE to not overlap multicast IDs of other UEs within the MME, and transmitting the determined multicast ID to one of the discovery server and the UE.

According to various embodiments of the present invention, an apparatus of a UE for D2D communication includes a communication for transmitting/receiving a signal, and a controller for controlling a function for acquiring a discovery code and a multicast ID to be used for transmitting additional information on an application program through a D2D multicast subframe based on an ID of the UE for the application program and broadcasting the discovery code and the multicast ID in a discovery subframe.

According to various embodiments of the present invention, an apparatus of a UE for D2D communication includes a communication unit for transmitting/receiving a signal, and a controller for controlling a function for receiving a discovery code and a multicast ID of a transmission UE, determining whether to receive additional information of the transmission UE based on the received discovery code, and, when it is determined that reception of the additional information will take place, receiving additional information having the multicast ID received through a D2D multicast subframe.

According to various embodiments of the present invention, an apparatus of a discovery server for D2D communication includes a communication unit for transmitting/receiving a signal, and controls a function for receiving an ID of a UE for an application program, determining a discovery code corresponding to the ID for the application program, and transmitting the discovery code and a multicast ID of the UE to the UE, wherein the multicast ID of the UE is used for transmitting additional information on the application program through a D2D multicast subframe.

According to various embodiments of the present invention, an apparatus of a Mobile Management Entity (MME) for D2D communication includes a communication unit for transmitting/receiving a signal, and a controller for controlling a function for receiving a request for transmitting a multicast ID of a UE from one of a discovery server and the UE, determining the multicast ID of the UE to not overlap multicast IDs of other UEs within the MME, and transmitting the determined multicast ID to one of the discovery server and the UE.

Effects of the Invention

According to an embodiment of the present invention, a discovery step between UEs may be divided into two steps. Small size discovery information may be transmitted through a discovery subframe in a first step and additional discovery information may be transmitted through a multicast subframe in a second step. Accordingly, it is possible to reduce consumption of resources required for discovery information transmission and reuse, for a discovery operation, the multicast subframe for the purpose of communication. Further, a reception UE may determine whether to receive additional information based on a discovery code and receive the additional information in the multicast subframe only when it is determined that reception of the additional information will take place, thereby acquiring a power saving effect.

DETAILED DESCRIPTION OF THE INVENTION

Figure 1:
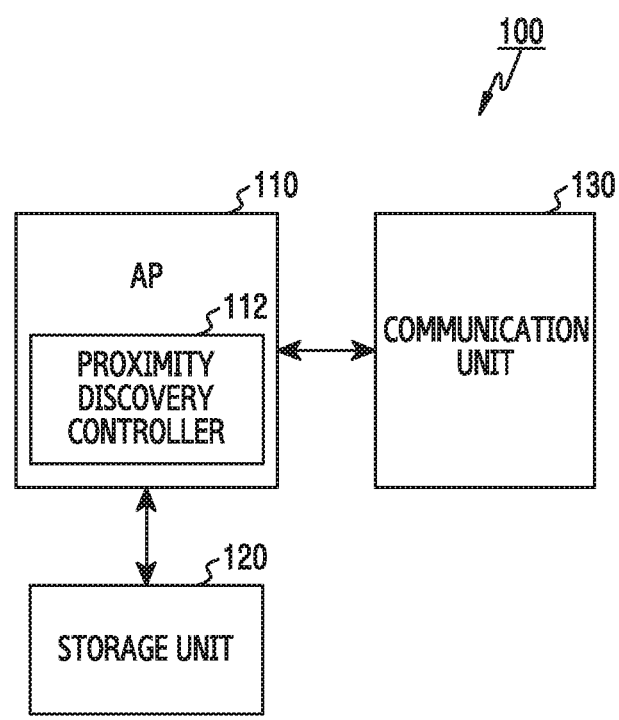
FIG. 1 is a block diagram illustrating a UE according to an embodiment of the present invention.

Hereinafter, various embodiments of the present invention will be described more fully in conjunction with the accompanying drawings. The present invention may have various embodiments, and modifications and changes may be made therein. Therefore, the present invention will be described in detail with reference to particular embodiments shown in the accompanying drawings. However, the description is not intended to limit the present invention to the specific embodiments, and it shall be appreciated that all the changes, equivalents and substitutions belonging to the idea and technical scope of the present invention are included in the present invention. In connection with descriptions of the drawings, like reference numerals designate like elements.

As used in various embodiments of the present invention, the expressions "have". "may have" "include" or "may include", and other conjugates refer to the existence of a corresponding disclosed function, operation, or constituent element, and do not limit one or more additional functions, operations, or constituent elements. Further, as used in various embodiments of the present invention, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

In various embodiments of the present invention, the expression "A or B" or "at least one of A or/and B" includes any or all of combinations of words listed together. For example, the expression "A or B" or "at least A or/and B" may include A, may include B, or may include both A and B.

While expressions including ordinal numbers, such as "first" and "second", as used in various embodiments of the present invention may modify various constituent elements, such constituent elements are not limited by the above expressions. For example, the above expressions do not limit the sequence and/or importance of the elements. The above-described expressions may be used to distinguish an element from another element. For example, a first user device and a second user device indicate different user devices although both of them are user devices. For example, a first element may be termed a second element, and likewise a second element may also be termed a first element without departing from the scope of various embodiments of the present invention.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The expression "configured (or set) to", used in this specification, may be interchangeably used with, for example, "suitable for," "having the capacity to." "designed to," "adapted to." "made to," or "capable of" according to circumstances. The term "configured (or set) to" may not necessarily mean "specifically designed to" in hardware. Instead, in some cases, the expression "device configured to" may mean that the device "can ~" together with other devices or components. For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms as used in various embodiments of the present invention are merely for the purpose of describing particular embodiments and are not intended to limit the various embodiments of the present invention. As used herein, the singular forms are intended to include the plural forms as well, unless the context clearly indicates otherwise.

Unless defined otherwise, all terms used herein, including technical terms and scientific terms, have the same meaning as commonly understood by a person of ordinary skill in the art to which various embodiments of the present invention pertain. Such terms as those defined in a generally used dictionary are to be interpreted to have the meanings equal to the contextual meanings in the relevant field of art, and are not to be interpreted to have ideal or excessively formal meanings unless clearly defined in the present invention.

Further, the present specification is described based on a wireless communication network, and tasks performed in the wireless communication network may be made during a process in which a system (for example, eNB) managing the corresponding wireless communication network controls the network and transmits data or made by a UE connecting to the corresponding wireless network.

A wireless communication system according to an embodiment of the present invention includes a plurality of Base Stations (BSs). Each BS provides a communication service to a specific geographical region (in general, referred to as a cell). The cell may be divided into a plurality areas (or sectors).

A Mobile Station (MS) may be fixed or mobile, and may be called another term, such as a User Equipment (UE), a Mobile Terminal (MT), a User Terminal (UT), a Subscriber Station (SS), a wireless device, a Personal Digital Assistance (PDA), a wireless modem, or a handheld device.

The BS generally refers to a fixed station that communicates with the UE, and may be called another term, such as an evolved-NodeB (eNB), a Base Transceiver System (BTS), or an Access Point (AP). The cell should be construed as an inclusive meaning indicating some areas covered by the BS and includes all various coverage areas such as a mega cell, macro cell, micro cell, pico cell, and femto cell. Hereinafter, a method of dividing a proximity discovery procedure in which the UE (or device) transmits/receives higher layer service information to/from an adjacent UE through radio resources into two steps, transmitting small size discovery information in a first step, and transmitting additional discovery information, which has not been transmitted in the first step, in a second step will be described. The higher layer service information may be information, for example, application program recognition information, user account information, and a user profile. The proximity discovery procedure is a procedure performed before a connection between UEs is generated, and a situation where a first UE (UE1) transfers the higher layer service information to a second UE (UE2) will be described hereinafter as an example for convenience of description. Hereinafter, communication between the first UE (UE1) and the second UE (UE2) may be performed through the BS, performed through D2D communication, or performed through a combination thereof.

According to an embodiment of the present invention, a first UE may generate a discovery code corresponding to an App-specific ID, which is an ID for identifying the first UE in an application program installed in the first UE, by using a preset rule or acquire the discovery code through communication with a server. Further, the first UE may acquire a multicast ID for transmitting additional information. The first UE may acquire the multicast ID from a discovery server or a D2D resource controller (for example, an MME, and hereinafter referred to as the MME as an example) that manages D2D resources. The first UE transmits a first discovery signal including the acquired discovery code and multicast ID through a discovery subframe. Thereafter, according to an embodiment, the first UE may transmit a second discovery signal including the multicast ID and additional information through a D2D multicast subframe. According to another embodiment, the first UE may transmit the additional information to the eNB before transmitting the first discovery signal, and make a request for transmission of the additional information through the D2D multicast subframe to the eNB. Here, the additional information may include higher layer service information related to an application program indicated by the App-specific ID.

A second UE may receive the first discovery signal in the discovery subframe, and determine whether to receive additional information having the corresponding multicast ID based on the discovery code included in the received first discovery signal. For example, the second UE may acquire, in advance, discovery codes corresponding to App-specific IDs of the application programs installed in the second UE, compare the discovery code acquired, in advance, with the received discovery code, and, when the second UE has the discovery code which is the same as the received discovery code, determine that reception of the additional information will take place by using the multicast ID included in the received first discovery signal. In another example, the second UE may acquire an App-specific ID by analyzing a discovery code according to a preset rule, determine whether an application program corresponding to the corresponding App-specific ID is installed in the second UE, and, when the application program is installed in the second UE, determine that reception of the additional information will be take place by using the App-specific ID or the multicast ID included in the received first discovery signal. When it is determined that reception of the additional information will take place, the second UE receives the second discovery signal having the corresponding multicast ID through the D2D multicast subframe. The second UE may configure original or additional higher layer discovery information by using the additional information included in the second discovery signal and the discovery code.

According to an embodiment of the present invention, the first discovery signal may further include resource information (for example, a resource size and a resource type) for receiving multicast data by the second UE. According to another embodiment, the second UE may make a request for the resource information for receiving the multicast data to a network and receive the resource information from the network. The first discovery signal may be a sequence or a data message type, and the second discovery signal may be only a data message type.

As described above, according to the present invention, in general, the search code may be transmitted through the discovery subframe suitable for transmission of fixed small size data, the additional information may be transmitted through the D2D multicast subframe suitable for transmission of variable large size data, and only UEs having the same application program among adjacently located UEs receive the additional information, so that a large amount of data can be transmitted with low power and resources can be efficiently used through sharing of the multicast subframe between a plurality of UEs.

Hereinafter, various embodiments of the aforementioned two-step discovery procedure will be described with reference to the drawings.

FIG. 1 is a block diagram illustrating a UE according to an embodiment of the present invention.

Referring to FIG. 1, a UE 100 includes an Application Processor (AP) 110, a storage unit 120, and a communication unit 130. The AP 110 may include a proximity discovery controller 112.

The AP 110 controls an operation of an application program installed in the UE 100. The AP 110 includes the proximity discovery controller 112, and controls and processes a function for performing a proximity discovery procedure before a D2D connection with another UE through the proximity discovery controller 112. The proximity discovery controller 112 controls and processes a function for generating a discovery code corresponding to an App-specific ID, which is an ID of the application program installed in the first UE, by using a preset rule or acquiring the discovery code through communication with the server. Further, the proximity discovery controller 112 may acquire a multicast ID for transmitting additional discovery information (or additional information) through communication between the communication unit 130 and a discovery server 200 or an MME 300. The proximity discovery controller 112 controls a function for transmitting the first discovery signal including the acquired discovery code and multicast ID through the discovery subframe. According to some embodiments, the proximity discovery controller 112 may control a function for transmitting a second discovery signal including the multicast ID and additional discovery information through the D2D multicast subframe. According to another embodiment, the proximity discovery controller 112 may transmit the additional discovery information to the eNB before transmitting the first discovery signal, and make a request for transmission of the additional discovery information through the D2D multicast subframe to the eNB. Here, the additional information may include higher layer service information related to an application program indicated by the App-specific ID.

Further, the proximity discovery controller 112 may receive a first discovery signal transmitted in a discovery subframe from another UE, and determine whether to receive additional discovery information having a multicast ID included in the first discovery signal based on a discovery code included in the received first discovery signal. For example, the proximity discovery controller 112 may compare discovery codes stored in the storage unit 120 with the received discovery code and, when the proximity discovery controller 112 has the discovery code which is the same as the received discovery code, determine to receive the additional discovery information by using the multicast ID included in the received first discovery signal. In another example, the proximity discovery controller 112 may acquire an App-specific ID by analyzing the received discovery code according to a preset rule, determine whether an application program corresponding to the corresponding App-specific ID is installed in the UE 100, and, when the application program is installed in the UE 100, determines that reception of the additional discovery information will take place by using the multicast ID included in the received first discovery signal. When it is determined that reception of the additional discovery information will take place, the proximity discovery controller 112 controls a function for receiving the second discovery signal having the multicast ID included in the first discovery signal, which is received through the D2D multicast subframe. The proximity discovery controller 112 may configure original or additional higher layer discovery information by using the additional discovery information included in the second discovery signal and the discovery code.

The storage unit 120 stores various pieces of data and programs required for the operation of the UE 100. The storage unit 120 may store App-specific ID information of each of the application programs installed in the UE 100. The storage unit 120 may store a discovery code corresponding to the App-specific ID or store a rule of calculating the discovery code from the App-specific ID. The storage unit 120 may store the discovery code and/or the multicast ID acquired from the discovery server or the MME 300 according to a control of the proximity discovery controller 112.

The communication unit 130 communicates with at least one other device (for example, UE, discovery server, MME, and the like). The communication unit 130 receives a command for transmitting/receiving the discovery signal from the AP 110 through an application protocol interface.

Figure 2:
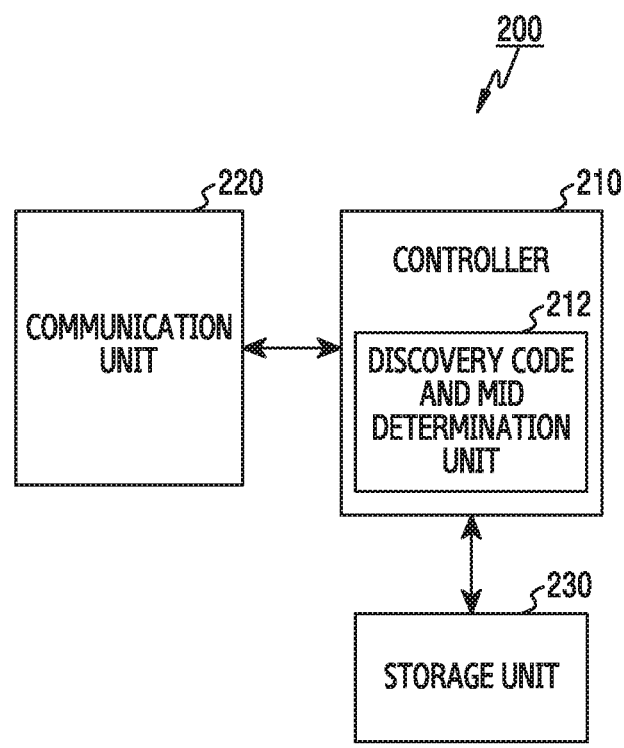
FIG. 2 is a block diagram illustrating a discovery server according to an embodiment of the present invention.

FIG. 2 is a block diagram illustrating a discovery server according to an embodiment of the present invention.

Referring to FIG. 2, a server 200 includes a controller 210, a communication unit 220, and a storage unit 230. The controller 210 may include a discovery code and MID allocation unit 212.

The controller 210 controls and processes the general operation of the discovery server. The controller 210 includes the discovery code and MID determination unit 212. The discovery code and MID allocation unit 212 determines a discovery code corresponding to the App-specific ID of the UE, and controls and processes a function for determining a multicast ID (MID) for transmission of additional discovery information of the UE. For example, the discovery code and MID determination unit 212 identifies the App-specific ID in a discovery code request signal received from the UE 100, determines the identified discovery code corresponding to the App-specific ID, and controls and processes a function for transmitting a discovery code response signal including the discovery code to the UE 100. Further, the discovery code and MID determination unit 212 acquires or determines the multicast ID for transmission of the additional discovery information of the UE 100.

The discovery code and MID determination unit 212 may make a request for the multicast ID to the MME 300, to which the UE pertains, and receive the multicast ID, or may search for information pre-stored in the storage unit 230 and acquire the multicast ID of the corresponding UE. For example, the discovery code and MID determination unit 212 identifies the MME of the UE 100 based on a GUTI acquired from the UE 100 and make a request for allocating the multicast ID of the UE 100 to the identified MME. The GUTI includes a GUMMEI (Globally Unique MME ID), which is identification information indicating the MME to which the UE 100 pertains, and an M-TMSI (MME-Temporary Mobile Subscriber ID) which is identification information for identifying the UE within the MME to which the UE 100 pertains.

According to another embodiment, when a request for a discovery code for an App-specific ID of a first UE 100-1 is made from a second UE 100-2, the discovery code and MID determination unit 212 may search for a multicast ID, GUTI, and a discovery code of the first UE 100-1 in a UE information DB stored in the storage unit 230. At this time, the discovery code and MID determination unit 212 may determine whether the first UE 100-1 and the second UE 100-2 pertain to the same MME and, when the first UE 100-1 and the second UE 100-2 pertain to the same MME, provide the discovery code and the multicast ID of the first UE 100-1 to the second UE 100-2. In contrast, when the first UE 100-1 and the second UE 100-2 pertain to different MMEs, the discovery code and MID determination unit 212 may identify whether the multicast ID of the first UE 100-1 overlaps with a second MME to which the second UE 100-2 pertains and, when the multicast ID of the first UE 100-1 does not overlap in the second MME, provide the discovery code and the multicast ID of the first UE 100-1 to the second UE 100-2. At this time, when the multicast ID of the first UE 100-1 overlaps with the second MME to which the second UE 100-2 pertains to, the discovery code and MID determination unit 212 may make a request for updating the multicast ID of the first UE 100-1 to a first MME, to which the first UE 100-1 pertains, receive a new multicast ID, and provide the discovery code and the new multicast ID of the first UE 100-1 to the first UE 100-1 and the second UE 100-2. In another example, when the multicast ID of the first UE 100-1 overlaps with the second MME to which the second UE 100-2 pertains, the discovery code and MID determination unit 212 may make a request for updating a multicast ID of a particular UE 100-x having the same multicast ID as that of the first UE 100-1 to the second MME, to which the second UE 100-2 pertains, receive a new multicast ID of the particular UE 100-x, transmit the received multicast ID to the particular UE 100-x, and provide the discovery code and the multicast ID of the first UE 100-1 to the first UE 100-1 and the second UE 100-2.

According to another embodiment, when the first UE 100-1 makes a request for the discovery code for its own App-specific ID, the discovery code and MID determination unit 212 may allocate only the discovery code corresponding to the App-specific ID and make a control to the first UE 100-1 to directly request the multicast ID from the MME and receive the multicast ID. According to another embodiment, when the second UE 100-2 makes a request for the discovery code for the App-specific ID of the first UE 100-1 which pertains to the same MME, the discovery code and MID determination unit 212 may provide information indicating whether the corresponding multicast ID conflicts within the corresponding MME while transmitting the discovery code and the multicast ID to the second UE 100-2. For example, whether another UE using the corresponding multicast ID within the same MME exists may be informed. Accordingly, the second UE 100-2 may determine whether to use the multicast ID of the first UE 100-1 or to make a request for updating the multicast ID of the first UE 100-1.

In addition, when the first UE 100-1 transmits additional discovery information to the eNB, the discovery code and MID determination unit 212 may determine the multicast ID for transmission of the additional discover information and transmit the determined multicast ID to the first UE 100-1 and the eNB.

The communication unit 220 communicates with at least one UE 100 and the MME 300. For example, the communication unit 220 may transmit/receive a discovery code request signal, a discovery code response signal, a multicast ID request signal, a multicast ID response signal, and the like to/from the UE 100 or the MME 300 according to a control of the controller 210.

The storage unit 230 may store various pieces of data and programs required for the operation of the discovery server 200, and map and store information on an App-specific ID, a discovery code, a GUTI, a multicast ID, and the like of each UE 100.

Figure 3:
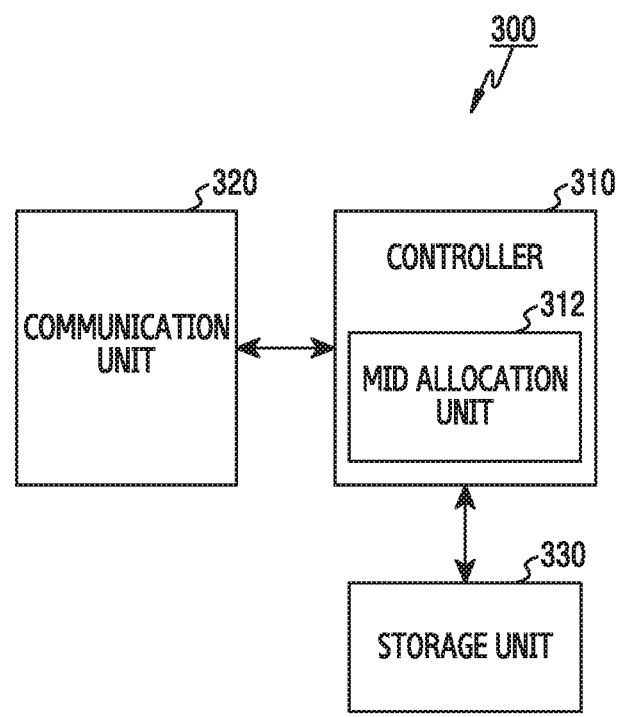
FIG. 3 is a block diagram illustrating an MME according to an embodiment of the present invention.

FIG. 3 is a block diagram illustrating an MME according to an embodiment of the present invention.

Referring to FIG. 3, an MME 300 includes a controller 310, a communication unit 320, and a storage unit 330. The controller 310 may include an MID allocation unit 312.

The controller 310 controls and processes the general operation for managing of mobility of the UE. The controller 310 includes the MID allocation unit 312, and the MID allocation unit 312 receives a request for transmitting the multicast ID of the UE from the UE 100 or the discovery server 200, and controls and processes a function for allocating the multicast ID of the corresponding UE in response to the request. When allocating the multicast ID of the UE, the MID allocation unit 312 may determine and allocate the multicast ID of the corresponding UE such that the multicast ID of the corresponding UE does not overlap a multicast ID of another UE which pertains to the corresponding MME 300. For example, when a request for the multicast ID of the second UE 100-2 pertaining to the corresponding MME 300 is made, the MID allocation unit 312 may determine and allocate the multicast ID of the second UE 100-2. In another example, when the multicast ID of the first UE 100-1 pertaining to another MME is included in a multicast ID update request signal, the MID allocation unit 312 may update the multicast ID of the particular UE 100-x having the same multicast ID as that of the first UE 100-1 within the corresponding MME 300. In another example, when the multicast ID of the first UE 100-1 pertaining to another MME is included in the multicast ID update request signal, the MID allocation unit 312 may make a request for updating the multicast ID of the first UE 100-1 to another MME to which the first UE 100-1 pertains, receive a new multicast ID, and transmit the received new multicast ID to the first UE 100-1.

The communication 320 communicates with at least one UE 100 and the discovery server 200. For example, the communication unit 320 may transmit/receive a multicast ID request signal, a multicast ID response signal, a multicast ID update request signal, a multicast ID update response signal, and the like to/from the UE 100 or the discovery server 200 according to a control of the controller 310.

The storage unit 330 may store various pieces of data and programs required for the operation of the MME 300, and store information on UEs pertaining to the MME 300 and multicast ID information of each UE 100.

Figure 4A:
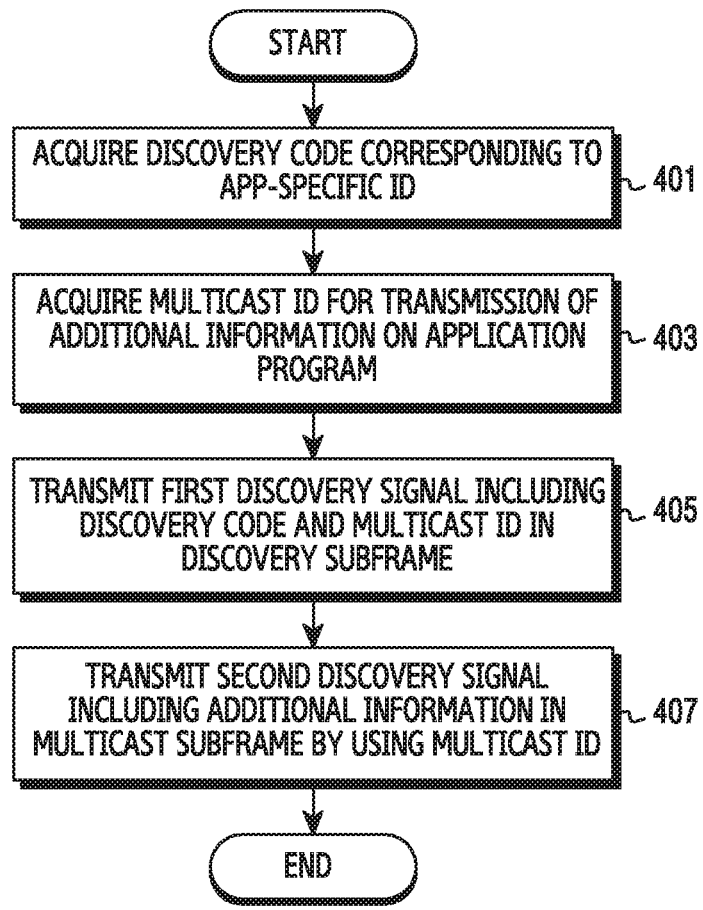
FIG. 4A illustrates a discovery procedure of a transmission UE according to an embodiment of the present invention.

FIG. 4A illustrates a discovery procedure of a transmission UE according to an embodiment of the present invention.

Referring to FIG. 4A, the transmission UE 100 acquires a discovery code corresponding to an App-specific ID, which is an ID of an application program installed in the transmission UE 100, in step 401. According to an embodiment, the transmission UE 100 may generate the discover code corresponding to the App-specific ID by using a preset rule. According to another embodiment, the transmission UE 100 may transmit the App-specific ID to a discovery server to request the discovery code, and receive the discovery code from the discovery server.

The transmission UE 100 acquires a multicast ID for transmission of additional discovery information of the application program in step 403. According to an embodiment, the transmission UE 100 may acquire the multicast ID from the discovery server 200.

According to another embodiment, the transmission UE 100 may transmit a signal making a request for allocating the multicast ID or updating the multicast ID to the MME 300, and receive the multicast ID from the MME 300.

The transmission UE 100 transmits a first discovery signal including the acquired discovery code and multicast ID through a discovery subframe in step 405.

Thereafter, the transmission UE 100 transmits a second discovery signal including additional discovery information by using the multicast ID in a D2D multicast subframe in step 407. According to some embodiments, the transmission UE 100 fragments the additional discovery information into a plurality of pieces of information, and repeatedly transmits a second discovery signal including the fragmented additional discovery information through a plurality of D2D multicast subframes repeated on a predetermined period.

Although it has been described that the transmission UE 100 transmits the second discovery signal in the D2D multicast subframe by using the multicast ID in FIG. 4A, the transmission UE 100 may transmit additional information to the eNB before transmitting the first discovery signal and thus the eNB may transmit the second discovery signal having the multicast ID in the D2D multicast subframe according to another embodiment.

In addition, in the conventional art, the UE completely accesses the eNB to make a request for a discovery signal and then receive a second discovery signal from the eNB, but, according to the aforementioned embodiment of the present invention, the terminal may receive the second discovery signal even in an idle state where the UE does not access the eNB.

Figure 4B:
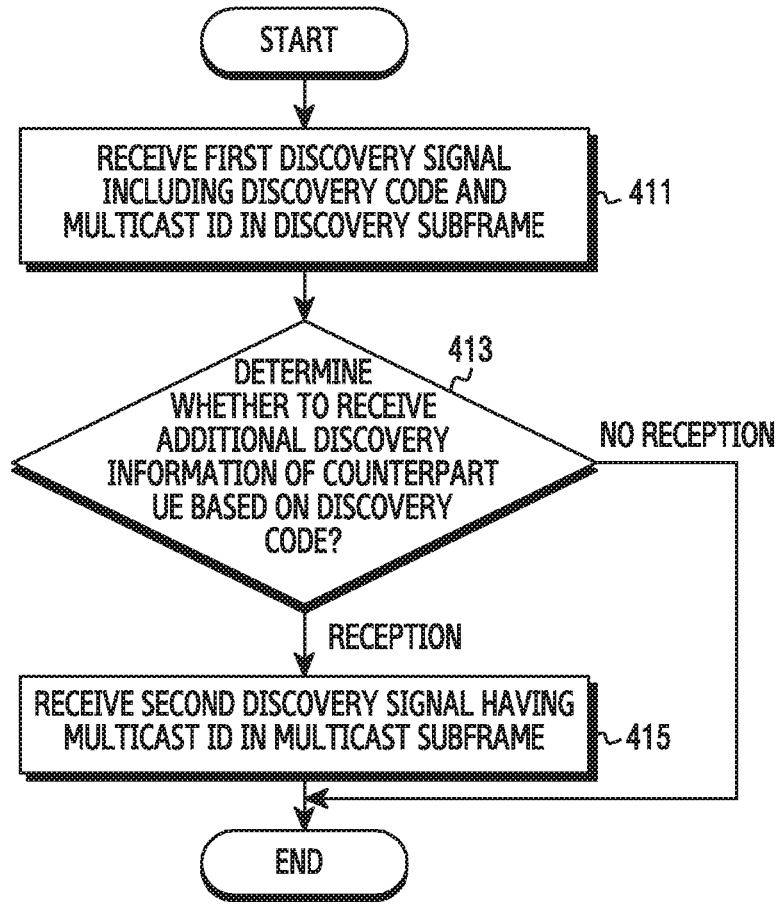
FIG. 4B illustrates a discovery procedure of a reception UE according to an embodiment of the present invention.

FIG. 4B illustrates a discovery procedure of a reception UE according to an embodiment of the present invention.

Referring to FIG. 4B, the reception UE 100 receives a first discovery signal including a discovery code and a multicast ID in a discovery subframe in step 411.

The reception UE 100 determines whether to receive additional discovery information from the UE having transmitted the first discovery signal based on the discovery code included in the first discovery signal in step 413. For example, the reception UE may acquire in advance discovery codes corresponding to App-specific IDs of application programs installed in the reception UE, compare the discovery codes acquired in advance with the received discovery code, and, when there is the discovery code which is the same as the received discovery code in the discovery codes acquired in advance, determine reception of the additional discovery information. In contrast, when there is no discovery code, which is the same as the received discovery code, in the discovery codes acquired in advance, the reception UE 100 may determine to not receive the additional discovery information. In another example, the reception UE 100 may acquire an App-specific ID by analyzing the discovery code according to a preset rule, determine whether an application program corresponding to the corresponding App-specific ID is installed in the reception UE, and, when the application program is installed in the reception UE, determine to receive the additional discovery information. In contrast, when the application program is not installed in the reception UE, the reception UE 100 may determine to not receive the additional discovery information.

When a determination is made to receive the additional discovery information, the reception UE 100 receives a second discovery signal having a multicast ID in a D2D multicast subframe in step 415. Here, the multicast ID refers to the multicast ID received in step 411. The reception UE 100 may configure original or additional higher layer discovery information by using the discovery code and the additional discovery information included in the second discovery signal.

Figure 5:
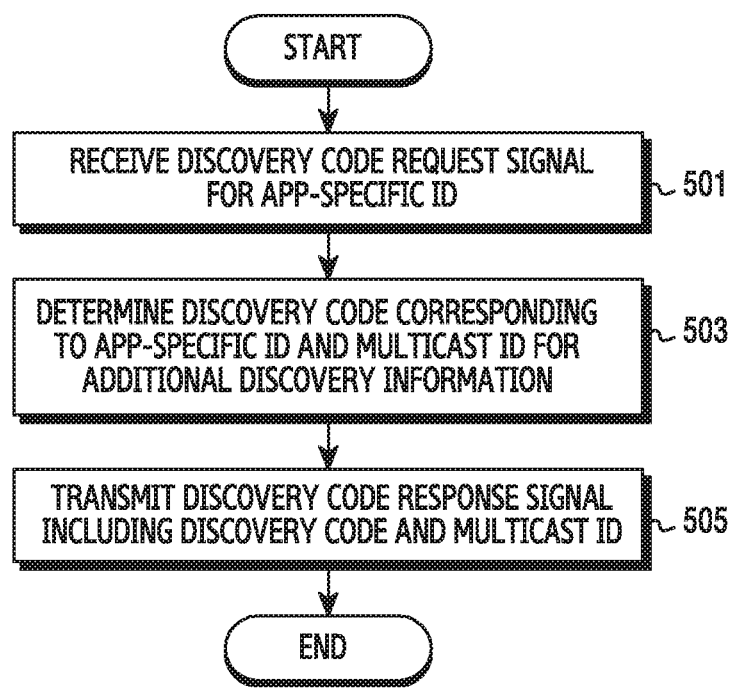
FIG. 5 illustrates an operation process of a discovery server for a discovery procedure of the UE according to an embodiment of the present invention.

FIG. 5 illustrates an operation process of the discovery server for a discovery procedure of the UE according to an embodiment of the present invention.

Referring to FIG. 5, the discovery server 200 receives a signal making a request for a discovery code corresponding to an App-specific ID from a particular UE in step 501, and determines the discovery code corresponding to the App-specific ID and a multicast ID for transmission of additional discovery information in step 503. The discovery server 200 may generate the discovery code corresponding to the App-specific ID based on a preset scheme or search for the discovery code corresponding to the App-specific ID in a pre-stored database. Further, the discovery server 200 may determine the multicast ID based on an ID of the corresponding UD through the pre-stored database or determine the multicast ID through communication with an MME to which the corresponding UE pertains. A scheme for determining the multicast ID will be described in detail through various embodiments with reference to FIGS. 11 to 21B below.

When the discovery code and the multicast ID are determined, the discovery server 200 transmits a discovery code response signal including the discovery code and the multicast ID to the corresponding UE in step 505. This is for D2D communication through the discovery code and the multicast ID without a control of a network node.

Although it has been described that the discovery server 200 determines the multicast ID, inserts the multicast ID into the discovery code response signal, and transmits the discovery code response signal in FIG. 5, the discovery server 200 may determine and transmit only the discovery code and the UE may make a request for the multicast ID to the MME and receive the multicast ID from the MME according to another embodiment.

Figure 6:
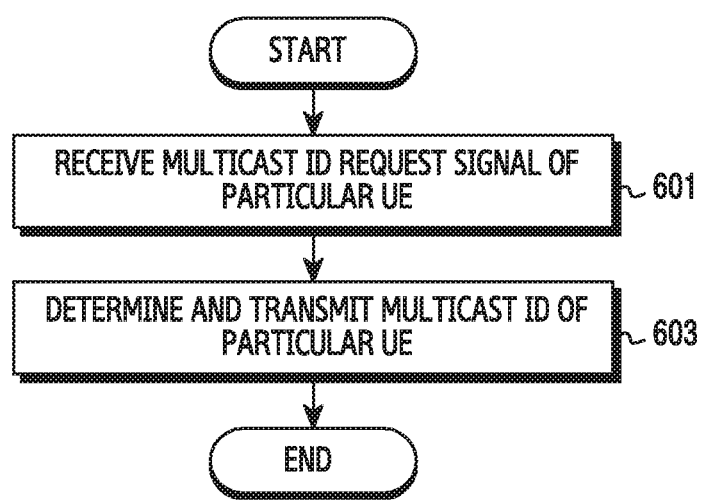
FIG. 6 illustrates an operation procedure of an MME according to an embodiment of the present invention.

FIG. 6 illustrates an operation procedure of the MME according to an embodiment of the present invention.

Referring to FIG. 6, the MME 300 receives a multicast ID request signal of a particular UE in step 601, and determines and transmits a multicast ID of the particular UE in step 603. Here, the multicast ID of the UE may be allocated to not overlap within the corresponding MME. According to some embodiments, the multicast ID request signal may be a signal making a request for updating the multicast ID of the particular UE or a signal making a request for updating a multicast ID of another UE that uses the same multicast ID as that of the particular UE. A scheme for determining the multicast ID will be described in more detail through various embodiments with reference to FIGS. 11 to 21B below.

In addition, embodiments of the present invention can be divided into four embodiments according to whether each of the transmission UE and the reception UE is included within a network range (or coverage area), and the four embodiments will be described below with reference to FIGS. 7 to 10.

Figure 7:
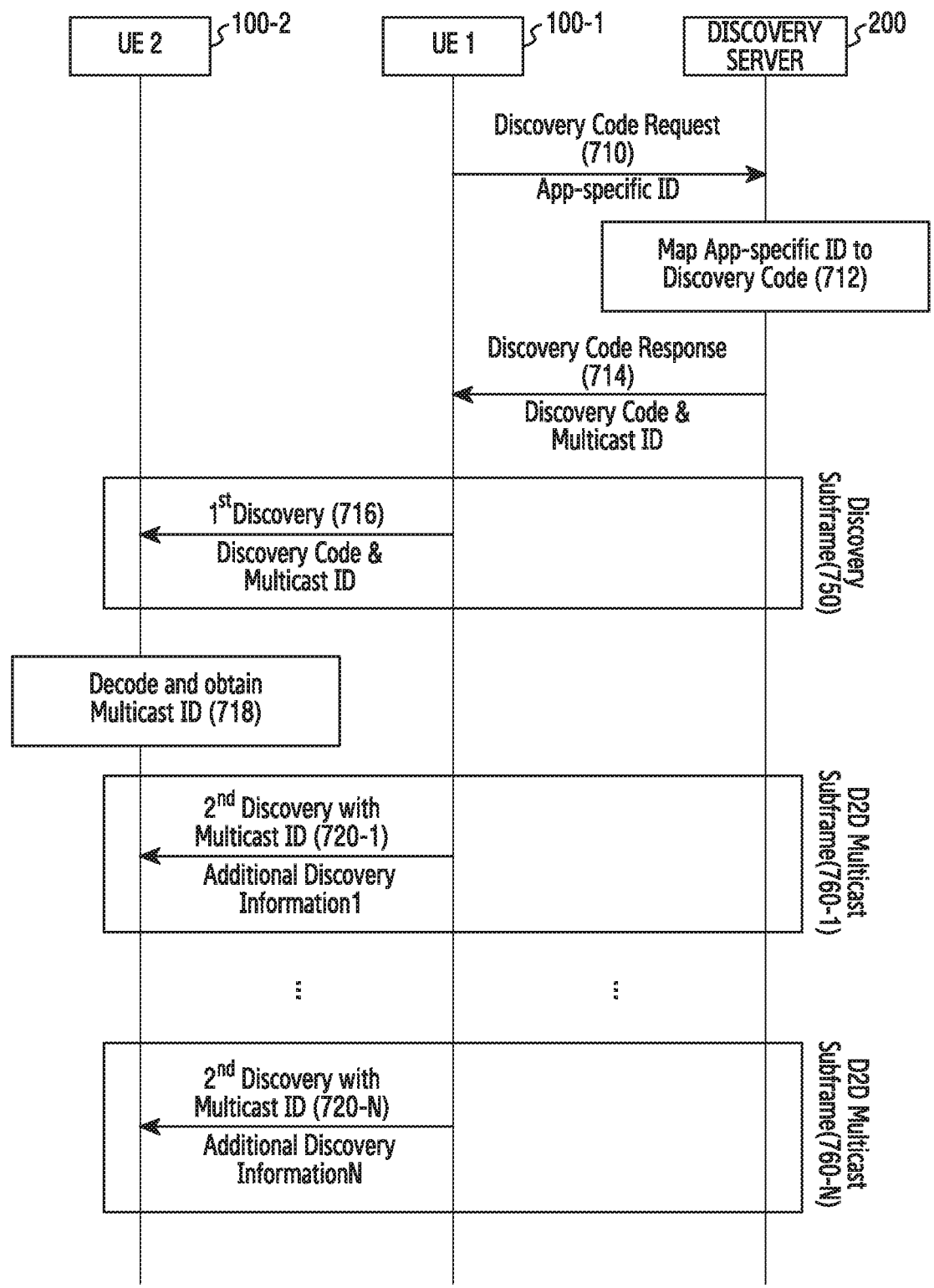
FIG. 7 illustrates a signal flow for a discovery procedure of two UEs included within a network range according to an embodiment of the present invention.

FIG. 7 illustrates a signal flow for a discovery procedure of two UEs included within a network range according to an embodiment of the present invention.

Referring to FIG. 7, UE #1 100-1 transmits a discovery code request signal including an App-specific ID to the discovery server 200 in step 710. The discovery server 200 may generate, acquire, or determine a discovery code corresponding to the App-specific ID based on a contract with an Application Service Provider (ASP) or communication with an ASP server, and map and store the App-specific ID and the discovery code in step 712. The discovery server 200 transmits a discovery code response signal including the discovery code and the multicast ID (or MID) to be used for transmission of additional discovery information of UE #1 100-1 to UE #1 100-1 in step 714. Here, the multicast ID may be acquired based on a database stored in advance in the discovery server 200 or communication with the MME 300 to which UE #1 100-1 pertains.

UE #1 100-1 identifies the discovery code and the multicast ID from the received discovery code response signal, and broadcasts a first discovery signal including the discovery code and the multicast ID through a discovery subframe 750 in step 716.

UE #2 100-2 having received the first discovery signal transmitted from UE #1 100-1 through the discovery subframe 750 decodes the received first discovery signal and acquires the multicast ID in step 718. According to some embodiments, UE #2 100-2 may determine whether to receive relevant additional discovery information based on the discovery code included in the first discovery signal, acquire the multicast ID when a determination is made to receive the additional discovery information, and ignore the first discovery signal without acquiring the multicast ID when a determination is made to not receive the additional discovery information.

In steps 720-1 to 720-N, UE #1 100-1 multicasts a second discovery signal including additional discovery information and having a multicast ID through at least one multicast subframe 760-1 to 760-N, and UE #2 100-2 receives the second discovery signal having the acquired multicast ID. According to some embodiments, when a period of the D2D multicast subframe is shorter than the discovery subframe and at least two D2D multicast subframes exist between the discovery subframes, UE #1 100-1 may fragment additional discovery information into at least two pieces of information and repeatedly transmit the second discovery signal including the fragmented additional discovery information through at least two D2D multicast subframes. In this case, UE #2 100-2 may configure original or additional higher layer discovery information by acquiring and combining at least two pieces of additional discovery information from the second discovery signals received through at least two D2D multicast subframes.

According to some embodiments, the period of the D2D multicast subframe may be configured to be the same as or different from the period of the discovery subframe.

Figure 8:
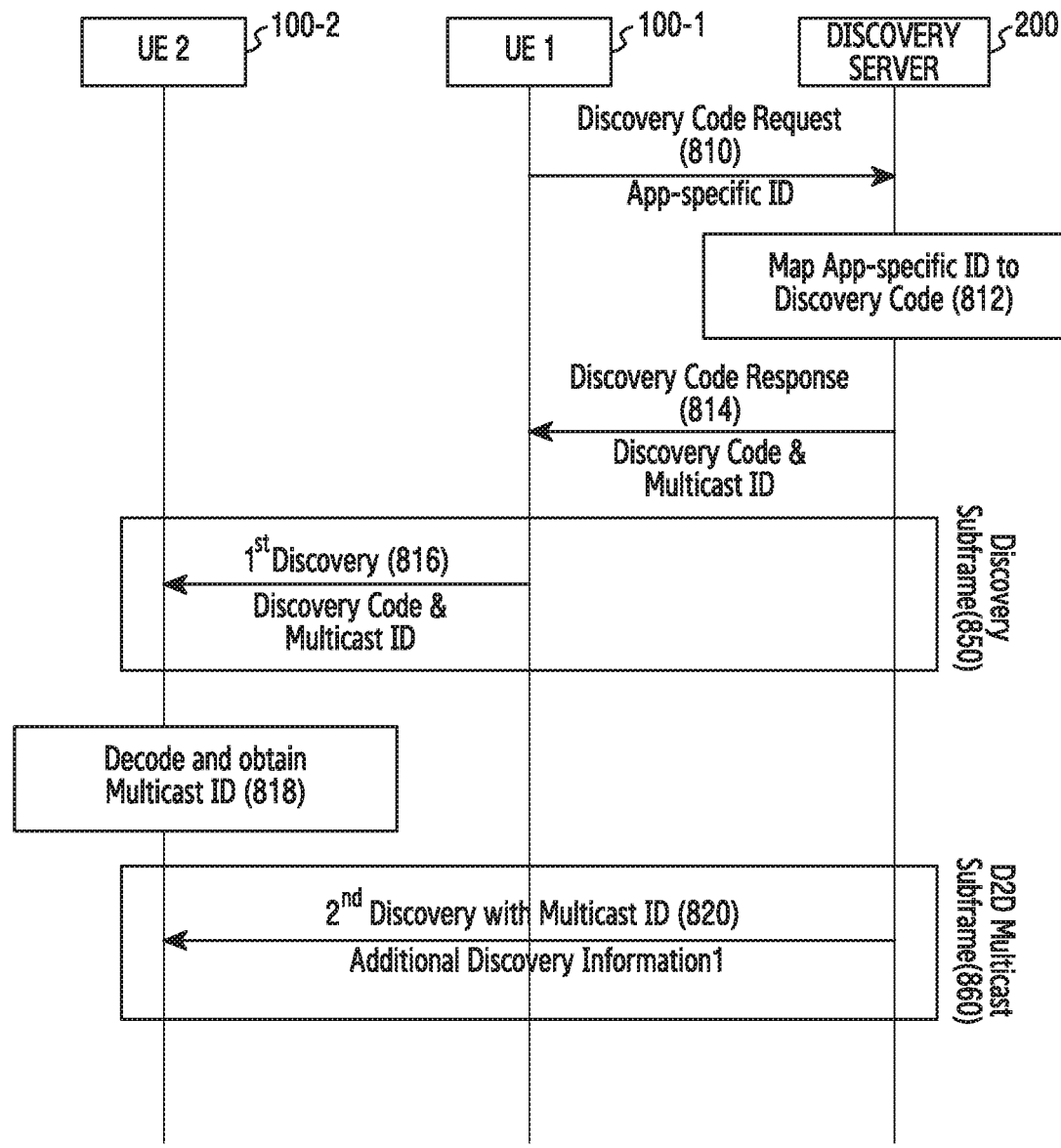
FIG. 8 illustrates a signal flow for a discovery procedure of two UEs included within the network range according to another embodiment of the present invention.

FIG. 8 illustrates a signal flow for a discovery procedure of two UEs included within a network range according to another embodiment of the present invention.

Referring to FIG. 8, UE #1 100-1 transmits a discovery code request signal including an App-specific ID and additional discovery information to the discovery server 200 in step 810. The discovery server 200 may generate, acquire, or determine a discovery code corresponding to the App-specific ID based on a contract with an Application Service Provider (ASP) or communication with an ASP server, and map and store the App-specific ID and the discovery code in step 812. The discovery server 200 transmits a discovery code response signal including the discovery code and a multicast ID (or MID) to be used for transmission of additional discovery information of UE #1 100-1 by an eNB (not shown) to UE #1 100-1 in step 814. Here, the multicast ID may be acquired based on a database stored in advance in the discovery server 200 or communication with the MME 300 to which UE #1 100-1 pertains. In addition, although not illustrated, UE #1 100-1 and the discovery server 200 may transmit/receive the discovery code request signal and the discovery code response signal through the eNB (not shown), and the eNB (not shown) may store the additional discovery information of UE #1 100-1 included in the discovery code request signal and the multicast ID included in the discovery response signal such that the additional discovery information and the multicast ID are linked to each other. This is to multicast the additional discovery information of UE #1 100-1 through the corresponding multicast ID in a D2D multicast subframe 860.

UE #1 100-1 identifies the discovery code and the multicast ID from the received discovery code response signal, and broadcasts a first discovery signal including the discovery code and the multicast ID through a discovery subframe 850 in step 816.

UE #2 100-2 having received the first discovery signal transmitted from UE #1 100-1 through the discovery subframe 850 decodes the received first discovery signal and acquires the multicast ID in step 818. According to some embodiments, UE #2 100-2 may determine whether to receive relevant additional discovery information based on the discovery code included in the first discovery signal, acquire the multicast ID when a determination is made to receive the additional discovery information, and ignore the first discovery signal without acquiring the multicast ID when a determination is made to not receive the additional discovery information.

Thereafter, in step 820, the eNB multicasts a second discovery signal including additional discovery information and having a multicast ID through the D2D multicast subframe 860, and UE #2 100-2 receives the second discovery signal having the acquired multicast ID. Although it has been described as an example that the eNB transmits the additional discovery information of UE #1 100-1 in an interval of one D2D multicast subframe 860, the eNB may fragment the additional discovery information into two pieces of information and repeatedly transmit the second discovery signal including the fragmented additional discovery information through at least two D2D multicast subframes when at least two D2D multicast subframes exist between the discovery frames according to some embodiments. In this case, UE #2 100-2 may configure original or additional higher layer discovery information by acquiring and combining at least two pieces of additional discovery information from the second discovery signals received through at least two D2D multicast subframes.

Figure 9:
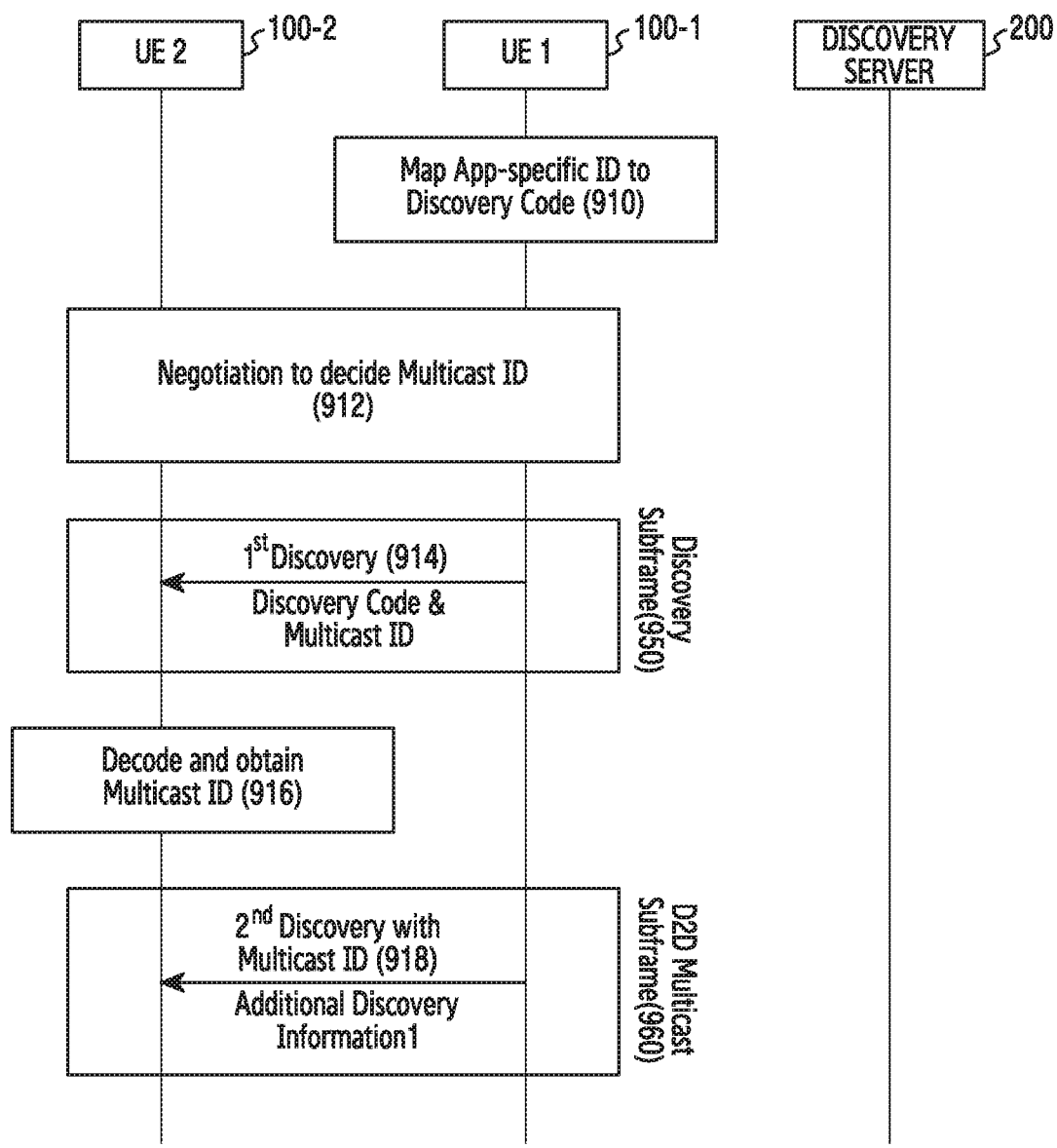
FIG. 9 illustrates a signal flow for a discovery procedure of two UEs existing beyond the network range according to another embodiment of the present invention.

FIG. 9 illustrates a signal flow for a discovery procedure of two UEs existing beyond the network range according to another embodiment of the present invention.

Referring to FIG. 9, UE #1 100-1 determines a discovery code corresponding to an App-specific ID in step 910. For example, UE #1 100-1 may determine the discovery code based on a preset mapping table or a preset rule. Here, since UE #1 100-1 exists beyond the network range, UE #1 100-1 may determine the discovery code by itself without making a request for the discovery code to the discovery server 200.

Thereafter, UE #1 100-1 performs a negotiation procedure with UE #2 100-2 to determine the multicast ID in step 912. According to some embodiments, the negotiation procedure for determining the multicast ID may operate based on a broadcasting signal rather than signal transmission/reception based on a connection in order to not generate a situation where adjacent UEs use the same multicast ID as the multicast ID used by UE #1 100-1. For example, each of UE #1 100-1 and UE #2 100-2 may make a request for transmitting a multicast ID, which is being used by each of adjacent UEs, to the adjacent UEs, receive the multicast IDs from the adjacent UEs, and generate a candidate list including the remaining multicast IDs except for the multicast IDs which are being used by the adjacent UEs among all available multicast IDs. Thereafter, UE #1 100-1 and UE #2 100-2 exchange the generated candidate lists to determine the multicast ID included in both candidate lists as the multicast ID to be used by UE #1 100-1.

Next, UE #1 100-1 broadcasts a first discovery signal including the discovery code and the multicast ID through a discovery subframe 950 in step 914.

UE #2 100-2 having received the first discovery signal transmitted from UE #1 100-1 through the discovery subframe 950 decodes the received first discovery signal and acquires the multicast ID in step 916. According to some embodiments, UE #2 100-2 may determine whether to receive relevant additional discovery information based on the discovery code included in the first discovery signal, acquire the multicast ID when a determination is made to receive the additional discovery information, and ignore the first discovery signal without acquiring the multicast ID when a determination is made to not receive the additional discovery information.

Thereafter, in step 918, UE #1 100-1 multicasts a second discovery signal including additional discovery information and having a multicast ID through a D2D multicast subframe 960, and UE #2 100-2 receives the second discovery signal having the acquired multicast ID. According to some embodiments, a scheme (for example, a scheme for fragmenting a D2D multicast subframe and transmitting/receiving the signal through the plurality of D2D multicast subframes) may be the same as the scheme described in FIG. 7.

Figure 10:
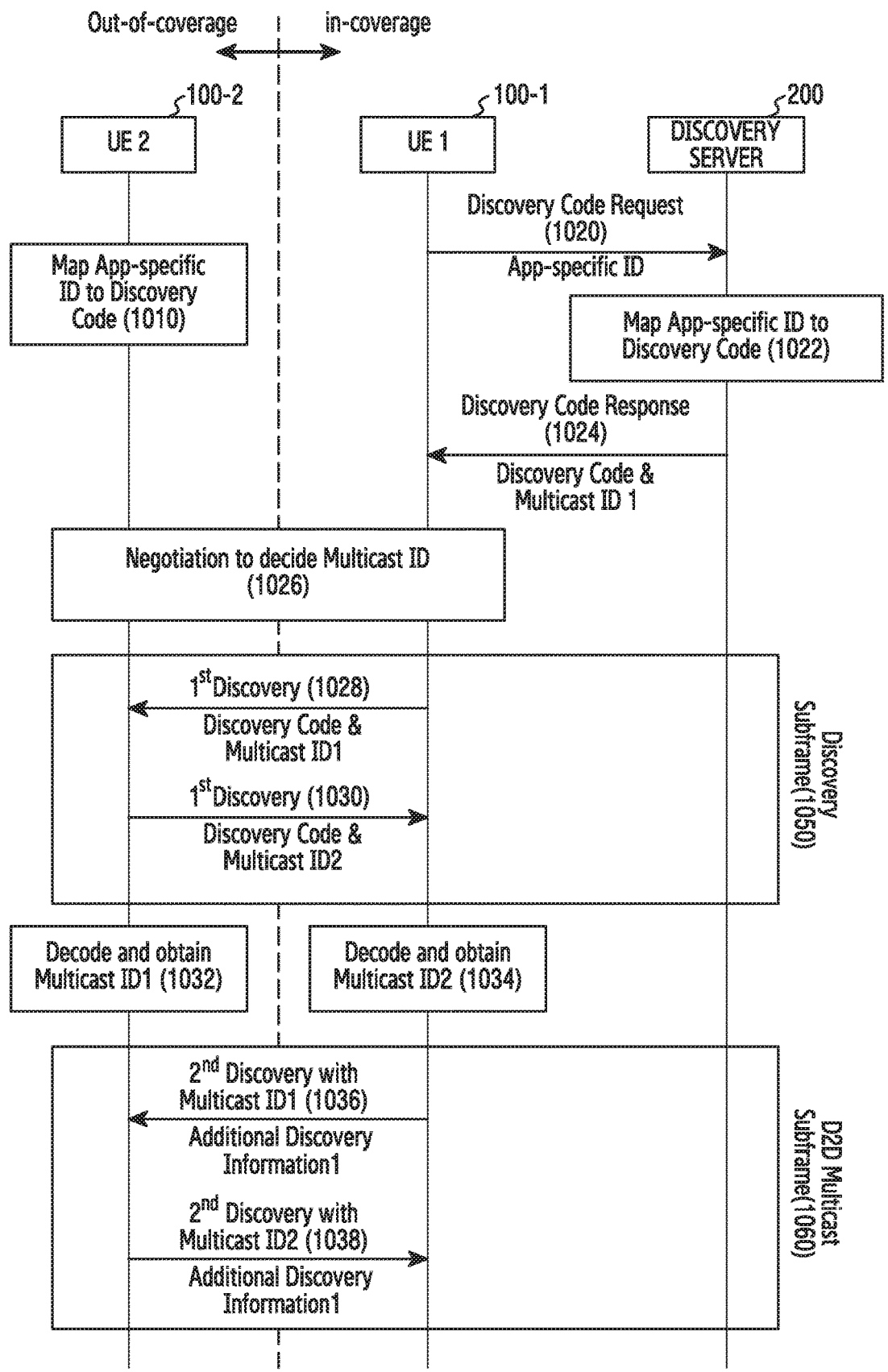
FIG. 10 illustrates a signal flow for a discovery procedure of the UE included within the network range and the UE beyond the network range according to another embodiment of the present invention.

FIG. 10 is illustrates a signal flow for a discovery procedure of the UE included within the network range and the UE beyond the network range according to another embodiment of the present invention. Here, a case where UE #1 100-1 existing within the network range and UE #2 100-2 existing beyond the network range transmit discovery signals for a proximity discovery will be described as an example.

Referring to FIG. 10, UE #2 100-2 existing beyond the network range determines a discovery code corresponding to an App-specific ID in step 1010. For example, UE #2 100-2 may determine the discovery code based on a preset mapping table or a preset rule. Here, since UE #2 100-2 exists beyond the network range, UE #2 100-2 may determine the discovery code by itself without making a request for the discovery code to the discovery server 200.

Meanwhile. UE #1 100-1 existing within the network range transmits a discovery code request signal including the App-specific ID to the discovery server 200 in step 1020. The discovery server 200 may generate, acquire, or determine a discovery code corresponding to the App-specific ID based on a contract with an Application Service Provider (ASP) or communication with an ASP server, and map and store the App-specific ID and the discovery code. The discovery server 200 transmits a discovery code response signal including the multicast ID (or MID) to be used for transmission of the discovery code and additional discovery information of UE #1 100-1 to UE #1 100-1 in step 1024. Here, the multicast ID may be acquired based on a database stored in advance in the discovery server 200 or communication with the MME 300 to which UE #1 100-1 pertains.

Thereafter, UE #1 100-1 performs a negotiation procedure with UE #2 100-2 to determine the multicast ID in step 1026. According to some embodiments, the negotiation procedure for determining the multicast ID may operate based on a broadcasting signal rather than signal transmission/reception based on a connection in order to not generate a situation where adjacent UEs use the same multicast ID as the multicast ID used by UE #1 100-1. For example, each of UE #1 100-1 and UE #2 100-2 may make a request for transmitting a multicast ID, which is used by each of adjacent UEs, to the adjacent UEs, receive the multicast IDs from the adjacent UEs, and generate a candidate list including the remaining multicast IDs except for the multicast IDs which are used by the adjacent UEs among all available multicast IDs. Thereafter, UE #2 100-2 may receive the candidate list generated by UE #1 100-1 and determine the multicast ID included in both the candidate list generated by UE #2 100-2 and the received candidate list as the multicast ID to be used by UE #2 100-2. Here, the multicast ID received from the discovery server 200 may be used as the multicast ID of UE #1 100-1.

After the negotiation procedure to determine the multicast ID, UE #1 100-1 and UE #2 100-2 broadcast the first discovery signal including the discovery code and the multicast ID through a discovery subframe 1050 in steps 1028 and 1030.

UE #2 100-2 having received the first discovery signal transmitted from UE #1 100-1 through the discovery subframe 1050 decodes the received first discovery signal and acquires the multicast ID to be used by UE #1 100-1 in step 1032. Further, UE #1 100-1 having received the first discovery signal transmitted from UE #2 100-2 through the discovery subframe 1050 decodes the received first discovery signal and acquires the multicast ID to be used by UE #2 100-2 in step 1034. According to some embodiments, each of UE #1 100-1 and UE #2 100-2 may determine whether to receive relevant additional discovery information based on the counterpart's discovery code included in the first discovery signal, acquire the multicast ID when a determination is made to receive the additional discovery information, and ignore the first discovery signal without acquiring the multicast ID when a determination is made to not receive the additional discovery information.

Thereafter, UE #1 100-1 and UE #2 100-2 multicast a second discovery signal including additional discovery information and having a multicast ID through a D2D multicast subframe 1060 in steps 1036 and 1038, respectively. At this time, UE #1 100-1 and UE #2 100-2 receive the second discovery signal having the multicast ID acquired from the counterpart's first discovery signal. According to some embodiments, a scheme (for example, a scheme for fragmenting a D2D multicast subframe and transmitting/receiving the signal through the plurality of D2D multicast subframes) may be the same as the scheme described in FIG. 7.

In FIGS. 11 to 21B, a scheme for determining the multicast ID to be used for additional information transmission will be described.

Figure 11:
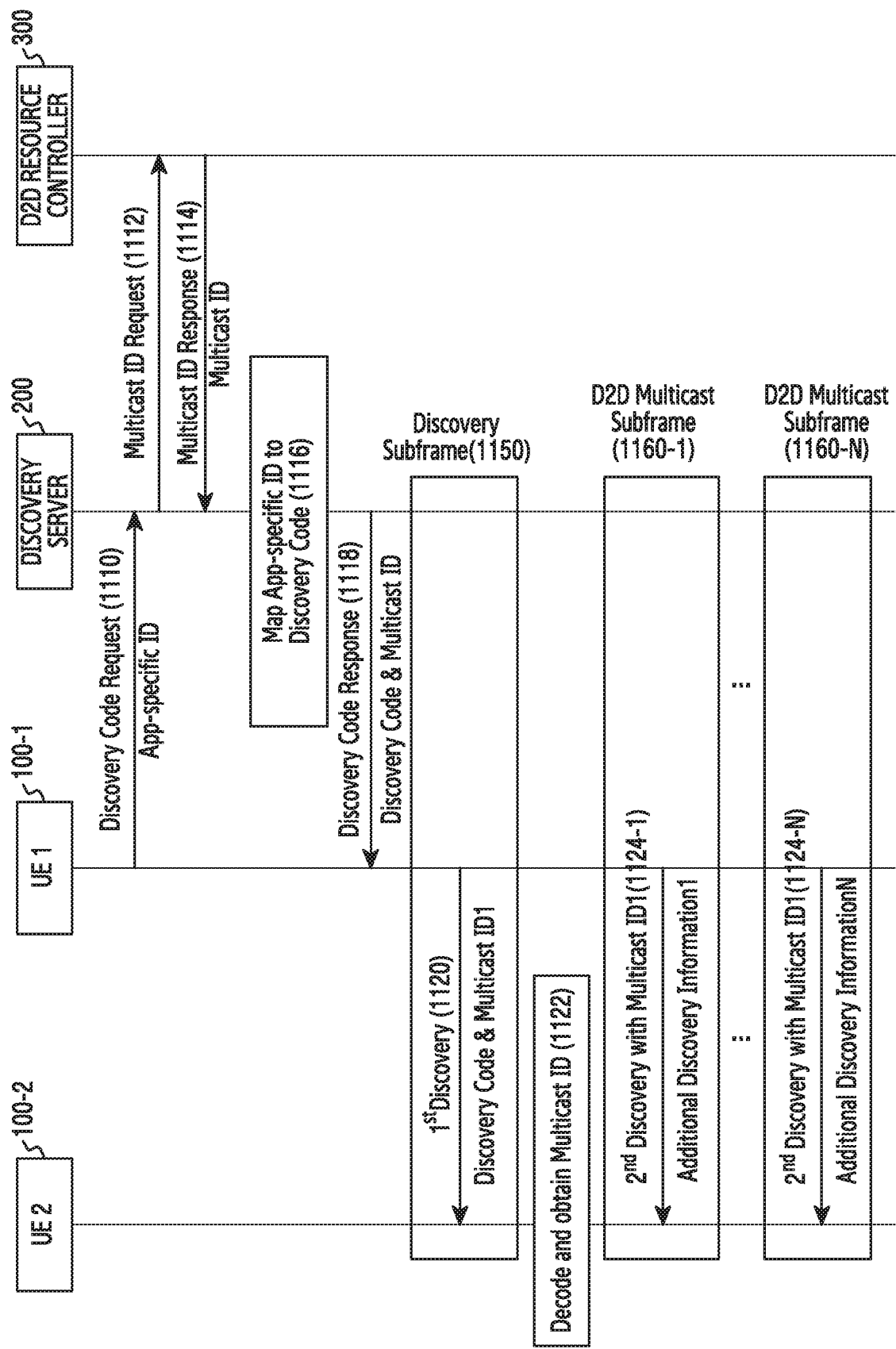
FIG. 11 illustrates a signal flow for a discovery procedure of two UEs included within the network range through acquisition of a multicast ID according to another embodiment of the present invention.

FIG. 11 illustrates a signal flow for a discovery procedure of two UEs included within the network range through acquisition of a multicast ID according to another embodiment of the present invention.

Referring to FIG. 11, UE #1 100-1 transmits a discovery code request signal including an App-specific ID to the discovery server 200 in step 1110. The discovery server 200 makes a request for allocation of a multicast ID to be used by UE #1 100-1 to a D2D resource controller 300. The D2D resource controller 300 determines the multicast ID to be used by UE #1 100-1 based on a preset rule according to a request of the discovery server 200, and transmits a multicast ID response message including the determined multicast ID to the discovery server 200 in step 1114. Here, the D2D resource controller may be a Mobile Management Entity (MME) or another network node that manages mobility of the UE.

The discovery server 200 may generate, acquire, or determine a discovery code corresponding to an App-specific ID based on a contract with an Application Service Provider (ASP) or communication with an ASP server, and map and store the App-specific ID and the discovery code in step 1116. The discovery server 200 transmits a discovery code response signal including the discovery code and the multicast ID to be used for transmission of the additional discovery information of UE #1 100-1 to UE #1 100-1 in step 1118. Thereafter, descriptions of steps 1120 to 1124 will be omitted since steps 1120 to 1124 of FIG. 11 are the same as steps 716 to 720 of FIG. 7.

FIGS. 12 to 21B illustrate various embodiments of determining the multicast ID of the UE, wherein the description of the procedure of transmitting/receiving the discovery signal is omitted but it is apparent that the procedure of transmitting/receiving the discovery signal described in one of the embodiments of FIGS. 7 to 10 can be performed after the multicast ID is determined.

Figure 12:
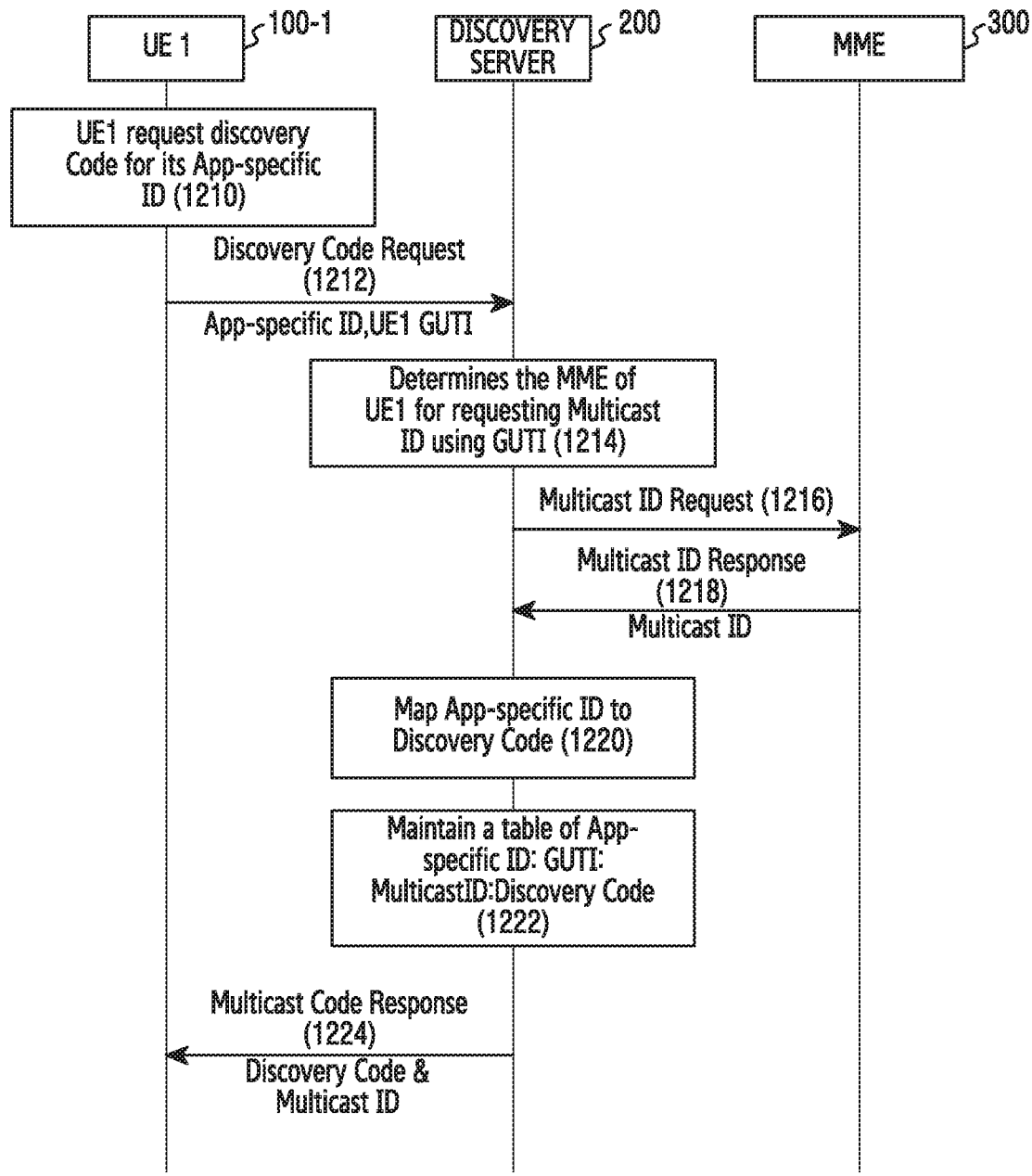
FIG. 12 illustrates a signal flow of acquiring a multicast ID using a Global Unique Temporary ID (GUTI) for a discovery procedure of two UEs included within the network range according to another embodiment of the present invention.

FIG. 12 illustrates a signal flow of acquiring a multicast ID using a Global Unique Temporary ID (GUTI) for a discovery procedure of two UEs included within the network range according to another embodiment of the present invention.

Referring to FIG. 12, UE #1 100-1 determines to make a request for a discovery code of an App-specific ID of UE #1 100-1 in step 1210, and transmits a discovery code request signal including the App-specific ID and a GUTI, which is an ID of UE #1, to the discovery server 200 in step 1212.

The discovery server 200 determines an MME, to which UE #1 100-1 pertains, based on the GUTI of UE #1 100-1 in order to make a request for a multicast ID of UE #1 100-1 in step 1214. The GUTI includes a combination of a GUMMEI (Globally Unique MMEI ID), which is identification information indicating the MME to which the UE 100 pertains, and an M-TMSI (MME-Temporary Mobile Subscriber ID) which is identification information for identifying the corresponding UE within the MME. Accordingly, the discovery server 200 may determine the MME, to which UE #1 100-1 pertains, by analyzing the GUTI.

The discovery server 200 transmits a signal making a request for the multicast ID of UE #1 100-1 to the determined MME 300 in step 1216, and the MME 300 determines the multicast ID of UE #1 100-1 according to the request of the discovery server 200 and transmits a multicast ID response signal including the determined multicast ID to the discovery server 200 in step 1218. Here, the MME 300 may determine the multicast ID of UE #1 100-1 such that the multicast ID of UE #1 100-1 does not overlap multicast IDs of other UEs pertaining to the corresponding MME 300.

The discovery server 200 determines a discovery code corresponding to the App-specific ID of UE #1 100-1 in step 1220, store the App-specific ID of UE #1 100-1, the GUTI, the multicast ID, and the discovery code in a table such that the App-specific ID, the GUTI, the multicast ID, and the discovery code are linked to each other in step 1222, and maintains and manages the corresponding table. Thereafter, the discovery server 200 transmits a multicast code response signal including the discovery code and the multicast ID to UE #1 100-1 in step 1224.

Figure 13A:
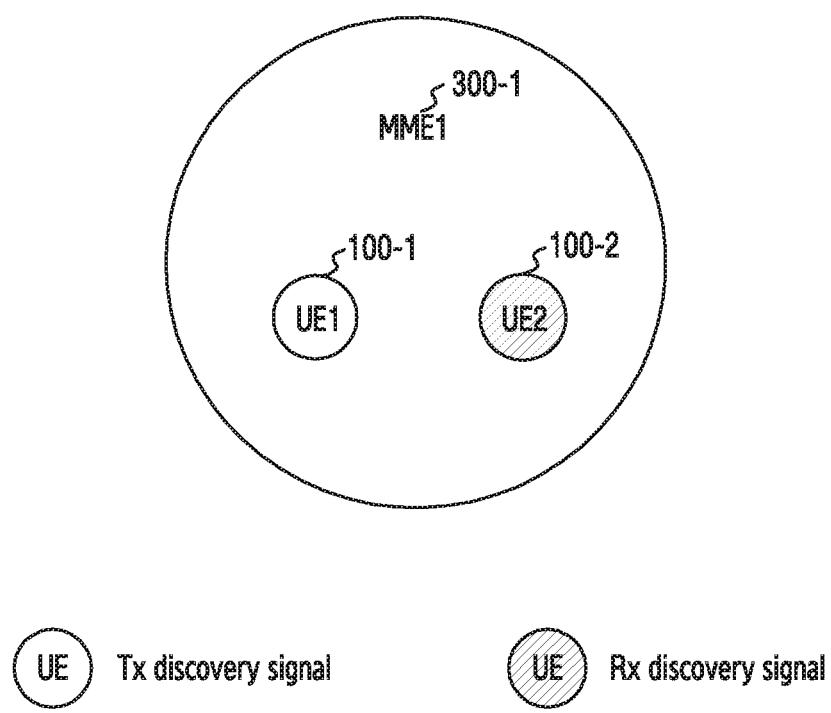
FIGS. 13A and 13B illustrate an embodiment in which the discovery server determines a multicast ID for a discovery procedure of two UEs pertaining to the same Mobile Management Entity (MME)
Figure 13B:
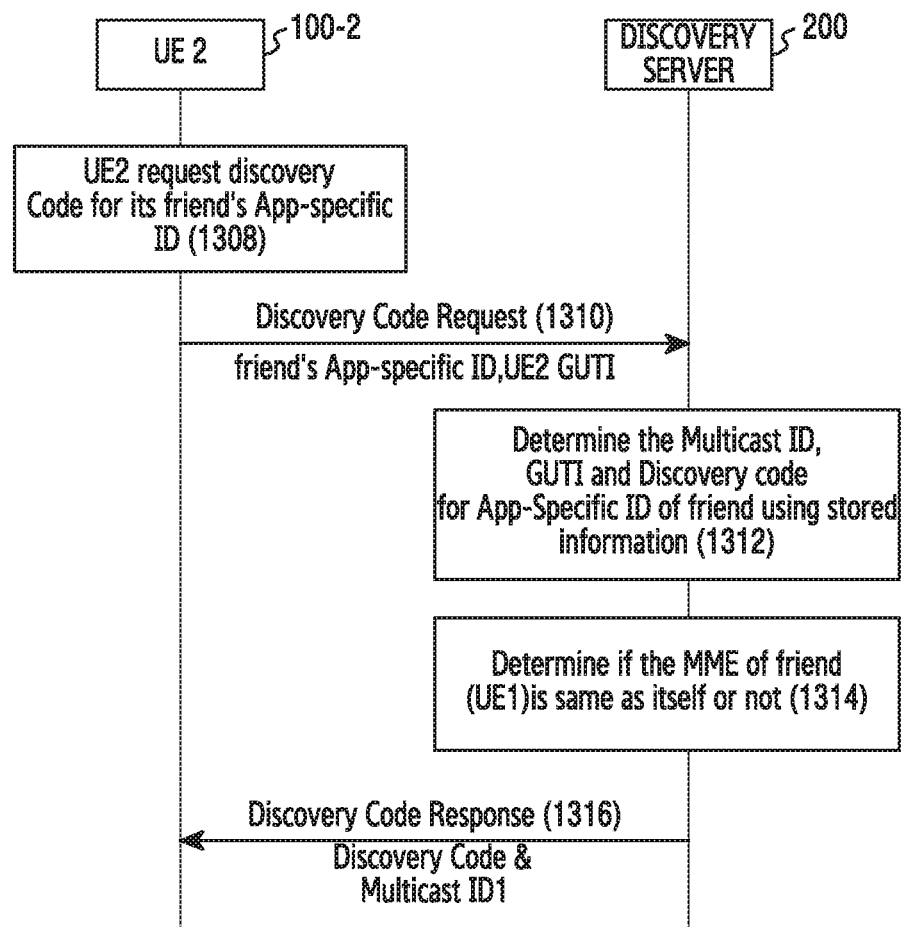

FIGS. 13A and 13B illustrate an embodiment in which the discovery server determines a multicast ID for a discovery procedure of two UEs pertaining to the same Mobile Management Entity (MME). As illustrated in FIG. 13A, it is assumed that UE #1 100-1 and UE #2 100-2 pertain to MME #1 300-1 in the present embodiment. Further, a procedure in which UE #2 100-2 acquires a multicast ID of UE #1 100-1 in order to receive a discovery signal from UE #1 100-1 will be described herein.

Referring to FIG. 13B, UE #2 100-2 determines to make a request for a discovery code of an App-specific ID of UE #1 100-1 in step 1308, and transmits a discovery code request signal including the App-specific ID of UE #1 100-1 and a GUTI, which is an ID of UE #2 100-2, to the discovery server 200 in step 1310. For example, when UE #2 100-2 desires to acquire information on UE #1 100-1, which is registered in a particular application program installed in UE #2 100-2 as a peer UE, UE #2 100-2 may determine that the discovery code for the App-specific ID of UE #1 100-1 is needed and make a request for the discovery code to the discovery server 200.

The discovery server 200 may search for the multicast ID of UE #1 100-1, the GUTI, and the discovery code corresponding to the App-specific ID of UE #1 100-1 from a pre-stored database in step 1312. Here, the pre-stored database may include a table of step 1222 generated by the operation illustrated in FIG. 12. Further, the discovery server 200 may configure the database by receiving in advance information on multicast IDs of UEs pertaining to the corresponding MME from the MME at a periodic time point or a particular event time point.

Thereafter, the discovery server 200 determines whether MMEs of UE #1 100-1 and UE #2 100-2 are the same in step 1314. Here, as illustrated in FIG. 13A, since it is assumed that the MMEs of UE #1 100-1 and UE #2 100-2 are the same, the discovery server 200 may determine that the MMEs of UE #1 100-1 and UE #2 100-2 are the same based on GUTIs of UE #1 100-1 and UE #2 100-2.

When the MMEs of UE #1 100-1 and UE #2 100-2 are the same, the discovery server 200 transmits a discovery code response signal including the discovery code and the multicast ID of UE #1 100-1 to UE #2 100-2 in step 1316. Here, the performance of step 1316 when the MMEs of the two UEs are the same is because it is predicted that a conflict problem is not generated even though UE #2 100-2 uses the multicast ID of UE #1 100-1 for additional discovery signal reception since the two UEs pertain to the same MME.

Figure 14A:
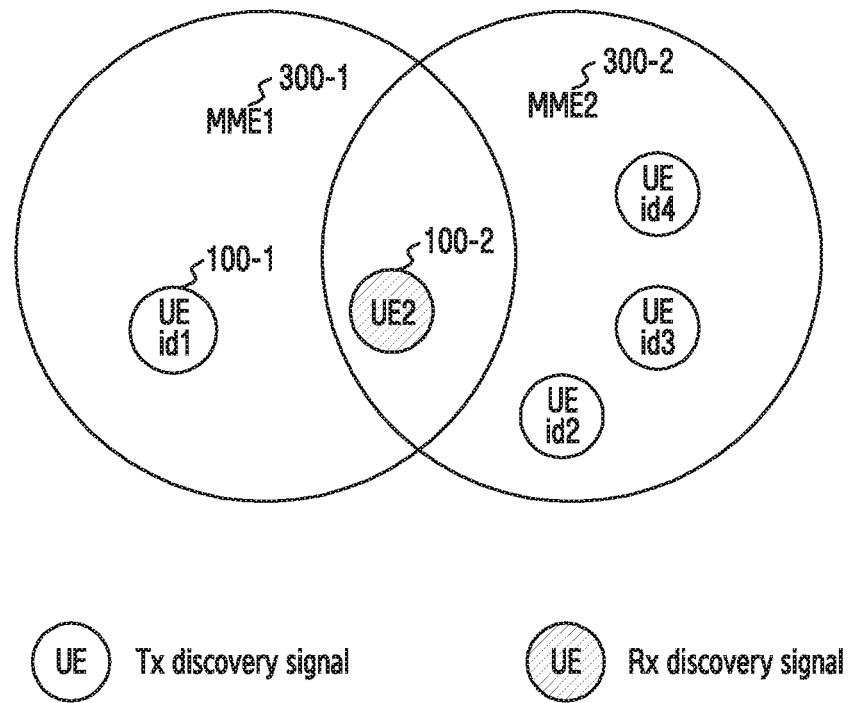
FIGS. 14A and 14B illustrate an embodiment in which the discovery server determines a multicast ID for a discovery procedure of two UEs pertaining to different MMEs.
Figure 14B:
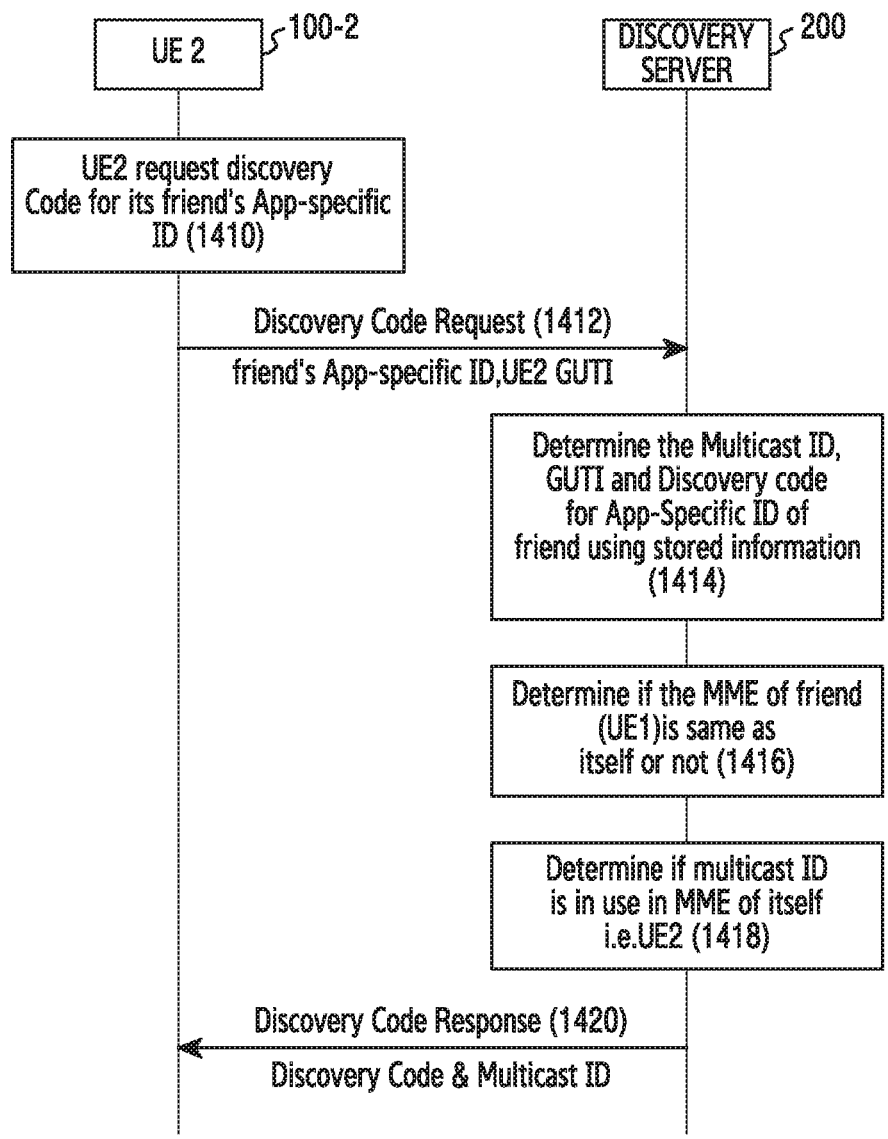

FIGS. 14A and 14B illustrate an embodiment in which the discovery server determines a multicast ID for a discovery procedure of two UEs pertaining to different MMEs.

As illustrated in FIG. 14A, it is assumed that UE #1 100-1 pertains to MME #1 300-1 and UE #2 100-2 is located in an overlapping area of MME #1 300-1 and MME #2 300-2 but pertains to MME #2 300-2 in the present embodiment. Further, a procedure in which UE #2 100-2 acquires a multicast ID of UE #1 100-1 in order to receive a discovery signal from UE #1 100-1 will be described herein.

Referring to FIG. 14B, UE #2 100-2 determines to make a request for a discovery code for an App-specific ID of UE #1 100-1 in step 1410, and transmits a discovery code request signal including the App-specific ID of UE #1 100-1 and a GUTI, which is an ID of UE #2 100-2, to the discovery server 200 in step 1412.

The discovery server 200 may search for the multicast ID of UE #1 100-1, the GUTI, and the discovery code corresponding to the App-specific ID of UE #1 100-1 from a pre-stored database in step 1414. Here, the pre-stored database may include a table of step 1222 generated by the operation illustrated in FIG. 12. Further, the discovery server 200 may configure the database by receiving information on multicast IDs of UEs pertaining to the corresponding MME from the MME at a periodic time point or a particular event time point. Further, the discovery server 200 may configure the database by receiving information on multicast IDs of UEs pertaining to the corresponding MME from the MME at a periodic time point or a particular event time point. Thereafter, the discovery server 200 determines whether MMEs of UE #1 100-1 and UE #2 100-2 are the same in step 1416. Here, as illustrated in FIG. 14A, since it is assumed that the MMEs of UE #1 100-1 and UE #2 100-2 are different, the discovery server 200 may determine that the MMEs of UE #1 100-1 and UE #2 100-2 are different based on GUTI of UE #1 100-1 and UE #2 100-2.

When UE #1 100-1 pertains to MME #1 300-1 and UE #2 100-2 pertains to MME #2 300-2, the discovery server 200 checks whether a multicast ID of UE #1 100-1 overlaps a multicast ID used within MME #2 300-2 in step 1418. As illustrated in FIG. 14A, when the multicast ID of UE #1 100-1 is "id1" and there is no UE using "id1" within MME #2 300-2, the discovery server 200 may determine that the multicast ID of UE #1 100-1 does not overlap the multicast ID used within MME #2 300-2

When the multicast Id of UE #1 100-1 does not overlap the multicast ID used within MME #2 300-2, the discovery server 200 predicts that a conflict problem is not generated even though UE #2 100-2 uses the multicast ID of UE #1 100-1 in order to receive a discovery signal, and transmits a discovery code response signal including the discovery code of UE #1 100-1 and the multicast ID to UE #2 100-2 in step 1420.

Figure 15A:
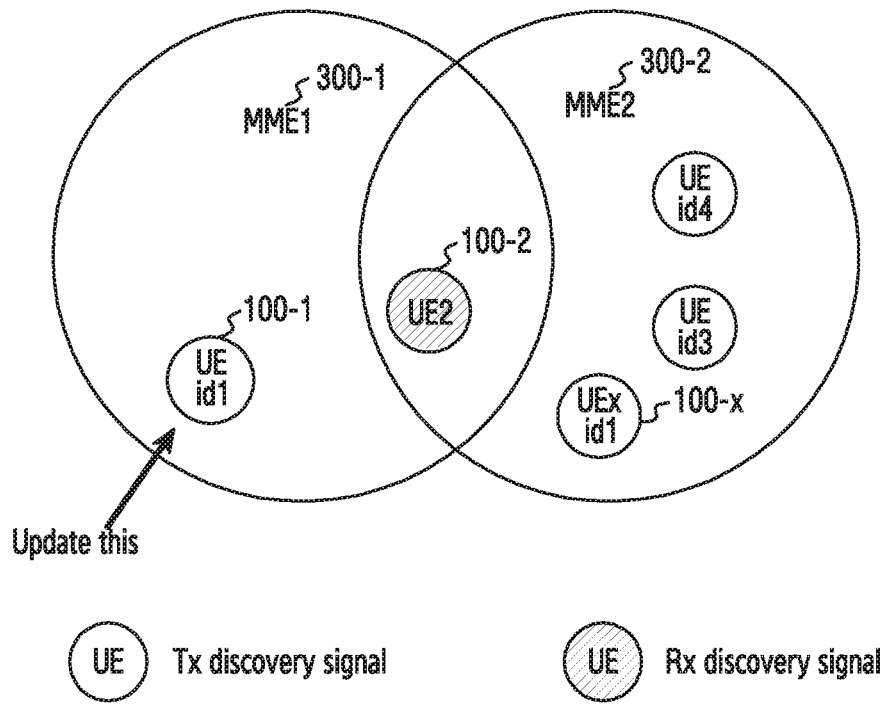
FIGS. 15A and 15B illustrate an embodiment of updating a multicast ID for a discovery procedure of two UEs pertaining to different MMEs.
Figure 15B:
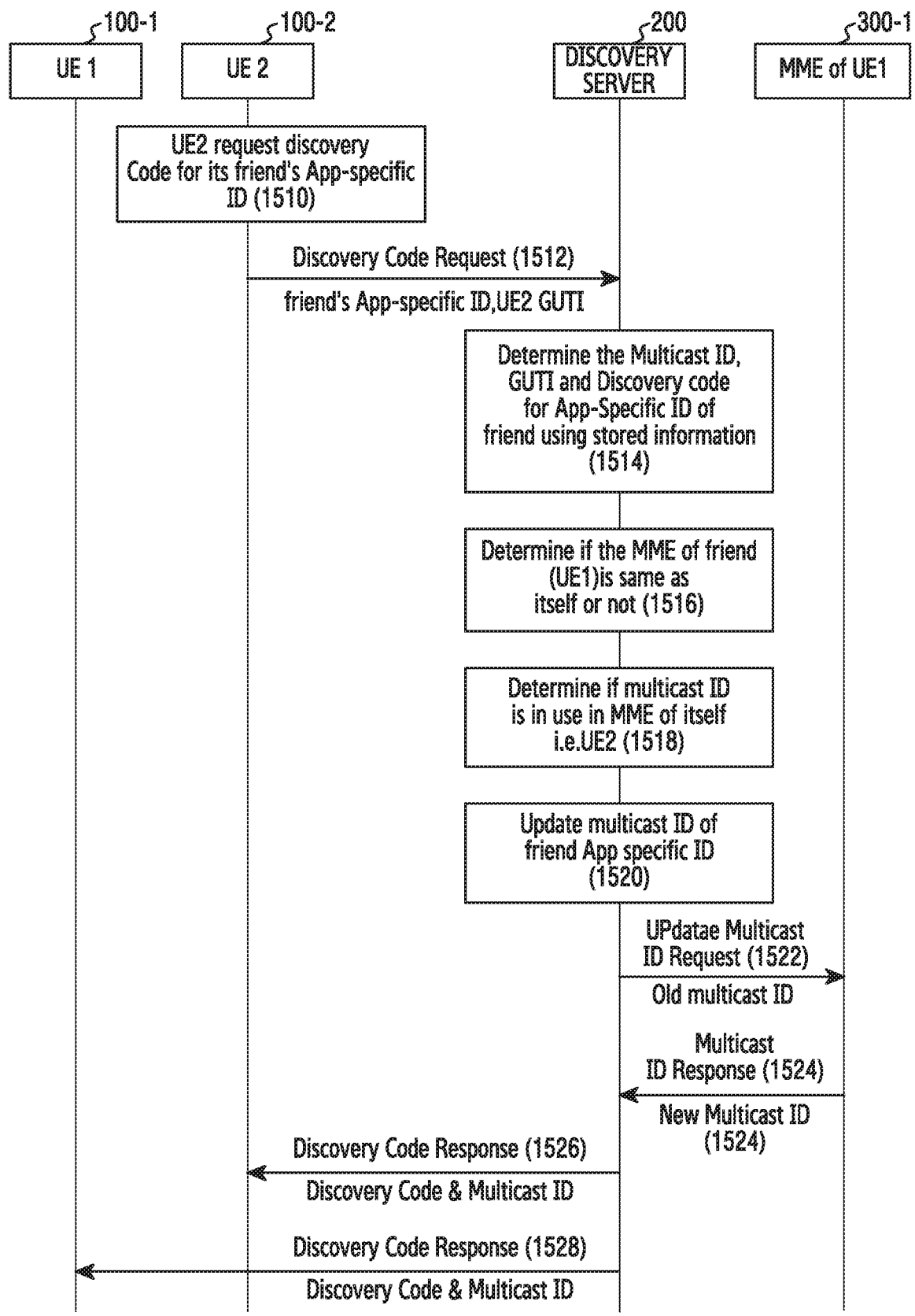

FIGS. 15A and 15B illustrate an embodiment of updating a multicast ID for a discovery procedure of two UEs pertaining to different MMEs.

As illustrated in FIG. 15A, it is assumed that UE #1 100-1 pertains to MME #1 300-1 and UE #2 100-2 is located in an overlapping area of MME #1 300-1 and MME #2 300-2 but pertains to MME #2 300-2 in the present embodiment. Further, a procedure in which UE #2 100-2 acquires a multicast ID of UE #1 100-1 in order to receive a discovery signal from UE #1 100-1 will be described herein.

Referring to FIG. 15B, UE #2 100-2 determines to make a request for a discovery code for an App-specific ID of UE #1 100-1 in step 1510, and transmits a discovery code request signal including the App-specific ID of UE #1 100-1 and a GUTI, which is an ID of UE #2 100-2, to the discovery server 200 in step 1512.

The discovery server 200 may search for the multicast ID of UE #1 100-1, the GUTI, and the discovery code corresponding to the App-specific ID of UE #1 100-1 from a pre-stored database in step 1514. Here, the pre-stored database may include a table of step 1222 generated by the operation illustrated in FIG. 12. Further, the discovery server 200 may configure the database by receiving in advance information on multicast IDs of UEs pertaining to the corresponding MME from the MME at a periodic time point or a particular event time point. Thereafter, the discovery server 200 determines whether MMEs of UE #1 100-1 and UE #2 100-2 are the same in step 1516. Here, as illustrated in FIG. 15A, since it is assumed that the MMEs of UE #1 100-1 and UE #2 100-2 are different, the discovery server 200 may determine that the MMEs of UE #1 100-1 and UE #2 100-2 are different based on GUTI of UE #1 100-1 and UE #2 100-2.

When UE #1 100-1 pertains to MME #1 300-1 and UE #2 100-2 pertains to MME #2 300-2, the discovery server 200 checks whether a multicast ID of UE #1 100-1 overlaps a multicast ID used within MME #2 300-2 in step 1518. As illustrated in FIG. 15A, when the multicast ID of UE #1

100-1 is "id1" and a particular UE 100-x uses "id1" within MME #2 300-2, the discovery server 200 may determine that the multicast ID of UE #1 100-1 overlaps the multicast ID used within MME #2 300-2.

When it is determined that the multicast ID of UE #1 100-1 overlaps the multicast ID used within MME #2 300-2, the discovery server 200 determines to update the multicast ID of UE #1 100-1 in step 1520 and makes a request for updating the multicast ID of UE #1 100-1 to MME #1 300-1 in step 1522. At this time, the discovery server 200 may transmit the multicast ID of UE #1 100-1 to MME #1 300-1.

MME #1 300-1 allocates a new multicast ID to UE #1 100-1, and transmits a multicast ID response message including the new multicast ID to the discovery server 200 in step 1524.

Thereafter, the discovery server 200 transmits a discovery code response signal including the discovery code of UE #1 100-1 and the new multicast ID to UE #2 100-2 in step 1526. Further, since the new multicast ID is allocated to UE #1 100-1, the discovery server 200 may transmit the discovery code response signal including the discovery code and the new multicast ID to UE #1 100-1 in step 1528.

Figure 16A:
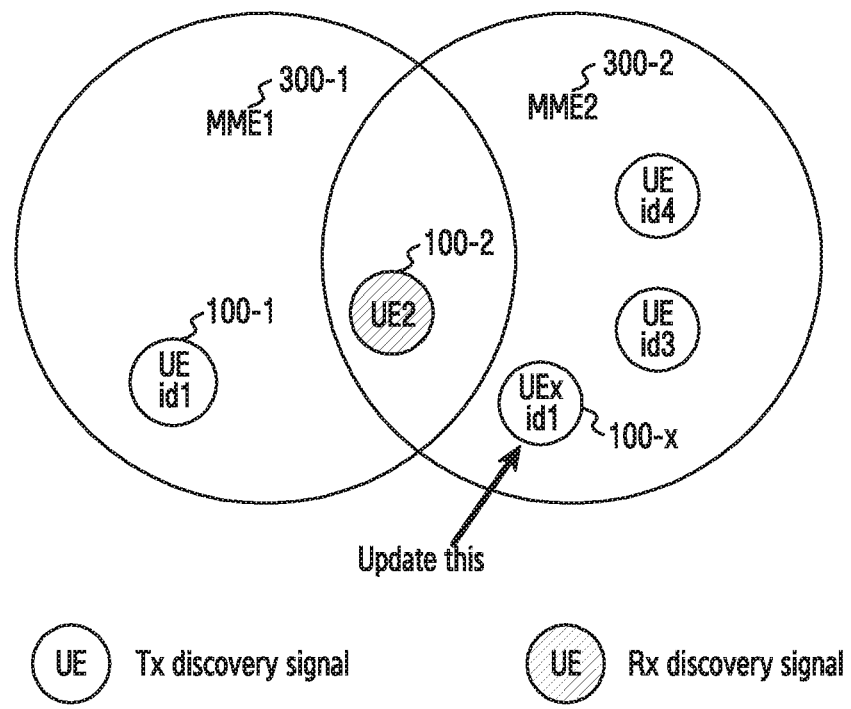
FIGS. 16A and 16B illustrate an embodiment of updating a multicast ID for a discovery procedure of two UEs pertaining to different MMEs.
Figure 16B:
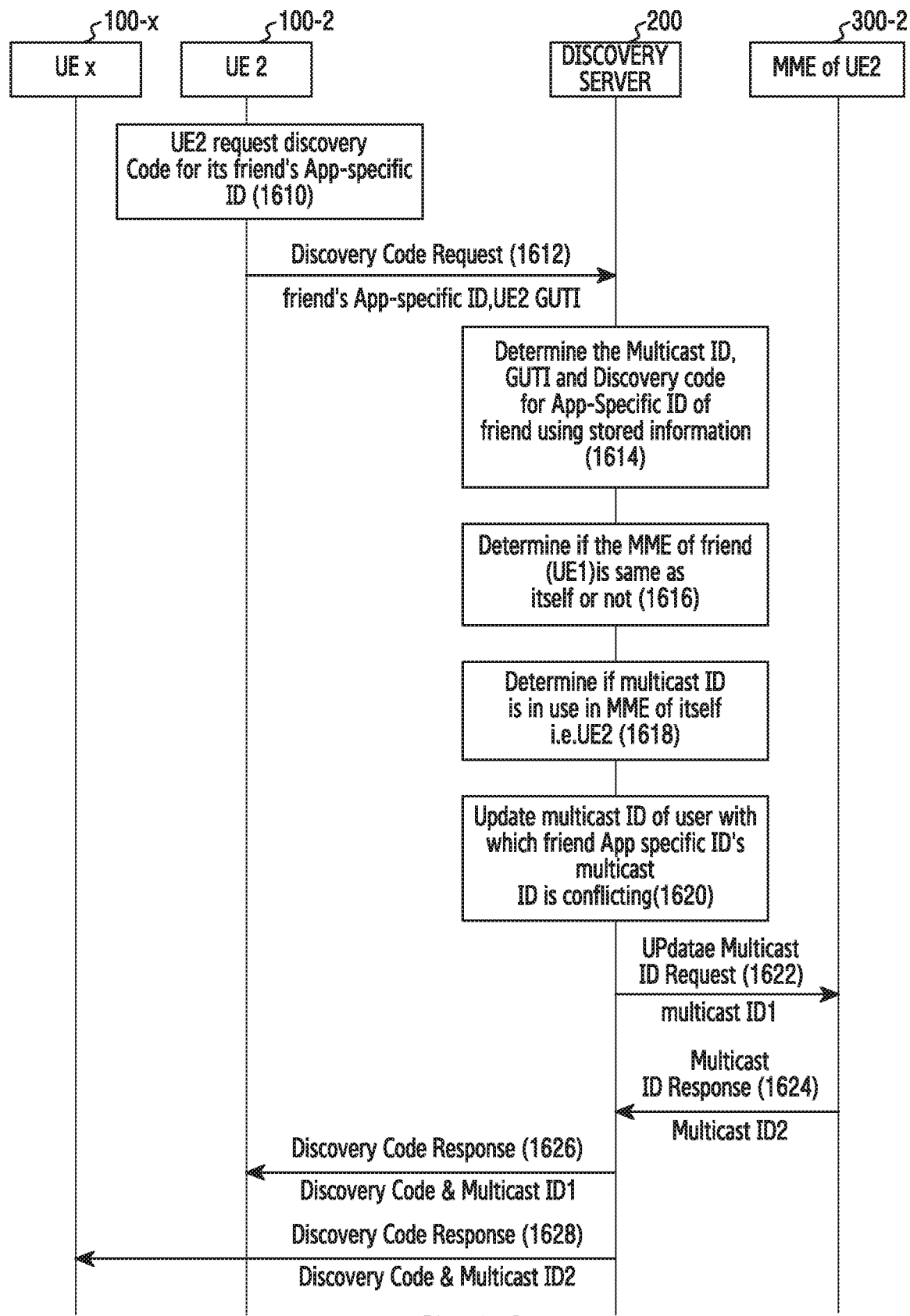

FIGS. 16A and 16B illustrate an embodiment of updating a multicast ID for a discovery procedure of two UEs pertaining to different MMEs.

As illustrated in FIG. 16A, it is assumed that UE #1 100-1 pertains to MME #1 300-1 and UE #2 100-2 is located in an overlapping area of MME #1 300-1 and MME #2 300-2 but pertains to MME #2 300-2 in the present embodiment. Further, a procedure in which UE #2 100-2 acquires a multicast ID of UE #1 100-1 in order to receive a discovery signal from UE #1 100-1 will be described herein.

Referring to FIG. 16B, UE #2 100-2 determines to make a request for a discovery code for an App-specific ID of UE #1 100-1 in step 1610, and transmits a discovery code request signal including the App-specific ID of UE #1 100-1 and a GUTI, which is an ID of UE #2 100-2, to the discovery server 200 in step 1612.

The discovery server 200 may search for the multicast ID of UE #1 100-1, the GUTI, and the discovery code corresponding to the App-specific ID of UE #1 100-1 from a pre-stored database in step 1614. Here, the pre-stored database may include a table of step 1222 generated by the operation illustrated in FIG. 12. Further, the discovery server 200 may configure the database by receiving in advance information on multicast IDs of UEs pertaining to the corresponding MME from the MME at a periodic time point or a particular event time point. Thereafter, the discovery server 200 determines whether MMEs of UE #1 100-1 and UE #2 100-2 are the same in step 1616. Here, as illustrated in FIG. 16A, since it is assumed that the MMEs of UE #1 100-1 and UE #2 100-2 are different, the discovery server 200 may determine that the MMEs of UE #1 100-1 and UE #2 100-2 are different based on GUTI of UE #1 100-1 and UE #2 100-2.

When UE #1 100-1 pertains to MME #1 300-1 and UE #2 100-2 pertains to MME #2 300-2, the discovery server 200 checks whether a multicast ID of UE #1 100-1 overlaps a multicast ID used within MME #2 300-2 in step 1618. As illustrated in FIG. 16A, when the multicast ID of UE #1 100-1 is "id1" and a particular UE 100-x uses "id1" within MME #2 300-2, the discovery server 200 may determine that the multicast ID of UE #1 100-1 overlaps the multicast ID used within MME #2 300-2.

When it is determined that the multicast ID of UE #1 100-1 overlaps the multicast ID used within MME #2 300-2, the discovery server 200 determines to update the multicast ID of UE #1 100-1 in step 1620 and makes a request for updating the multicast ID of the particular UE 100-x to MME #2 300-2 in step 1622. At this time, the discovery server 200 may transmit the multicast ID of the particular UE 100-x to MME #2 300-2.

MME #2 300-2 allocates a new multicast ID to the particular UE 100-x, and transmits a multicast ID response message including the new multicast ID to the discovery server 200 in step 1624.

Thereafter, the discovery server 200 transmits a discovery code response signal including the discovery code of UE #1 100-1 and the multicast ID to UE #2 100-2 in step 1626. Further, since the new multicast ID is allocated to the particular UE 100-x, the discovery server 200 may transmit the discovery code response signal including the discovery code and the new multicast ID to the particular UE 100-x in step 1628.

FIGS. 11 to 16 illustrate embodiments in which the discovery server is linked to the MME and transmits/receives a multicast ID. Hereinafter, an embodiment in which the UE is linked to the MME and transmits/receives a multicast ID will be described.

Figure 17:
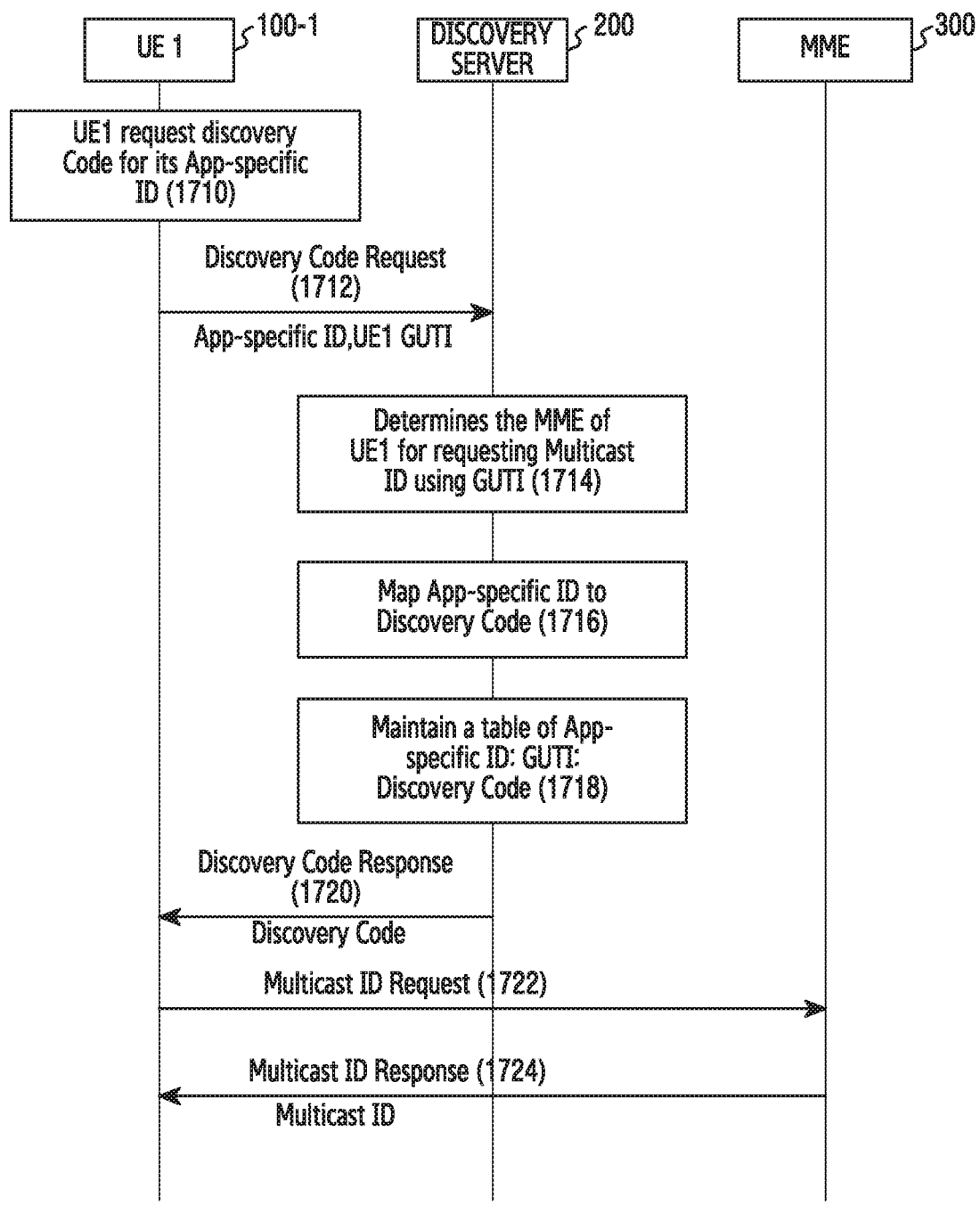
FIG. 17 illustrates a signal flow in which the UE makes a request for and acquires a multicast ID for a discovery procedure of two UEs included within the network range according to another embodiment of the present invention.

FIG. 17 illustrates a signal flow in which the UE makes a request for and acquires a multicast ID for a discovery procedure of two UEs included within the network range according to another embodiment of the present invention.

Referring to FIG. 17, UE #1 100-1 determines to make a request for a discovery code for an App-specific ID of UE #1 100-1 in step 1710, and transmits a discovery code request signal including the App-specific ID of UE #1 100-1 and a GUTI of UE #1 100-1 to the discovery server 200 in step 1712.

The discovery server 200 determines an MME, to which UE #1 100-1 pertains, based on the GUTI of UE #1 100-1 in order to make a request for a multicast ID of UE #1 100-1 in step 1714. The GUTI includes a combination of a GUMMEI (Globally Unique MME ID), which is identification information indicating the MME to which the UE 100 pertains, and an M-TMSI (MME-Temporary Mobile Subscriber ID) which is identification information for identifying the corresponding UE within the MME. Accordingly, the discovery server 200 may determine the MME, to which UE #1 100-1 pertains, by analyzing the GUTI.

The discovery server 200 determines a discovery code corresponding to the App-specific ID of UE #1 100-1 in step 1716, store the App-specific ID of UE #1 100-1, the GUTI, and the discovery code in a table such that the App-specific ID, the GUTI, and the discovery code are linked to each other in step 1718, and maintains and manages the corresponding table. The discovery server 200 may configure or update the table by receiving information on multicast IDs of UEs pertaining to the corresponding MME from the MME at a periodic time point or a particular event time point. Thereafter, the discovery server 200 transmits a multicast code response signal including the discovery code to UE #1 100-1 in step 1720.

Next, UE #1 100-1 transmits a signal making a request for a multicast ID to the MME 300 of UE #1 100-1 in step 1722, determines the multicast ID of UE #1 100-1, and transmits a multicast ID response signal including the determined multicast ID to UE #1 100-1 in step 1724. Here, the MME 300 may determine the multicast ID of UE #1 100-1 such that the multicast ID of UE #1 100-1 does not overlap multicast IDs of other UEs pertaining to the corresponding MME 300.

Figure 18A:
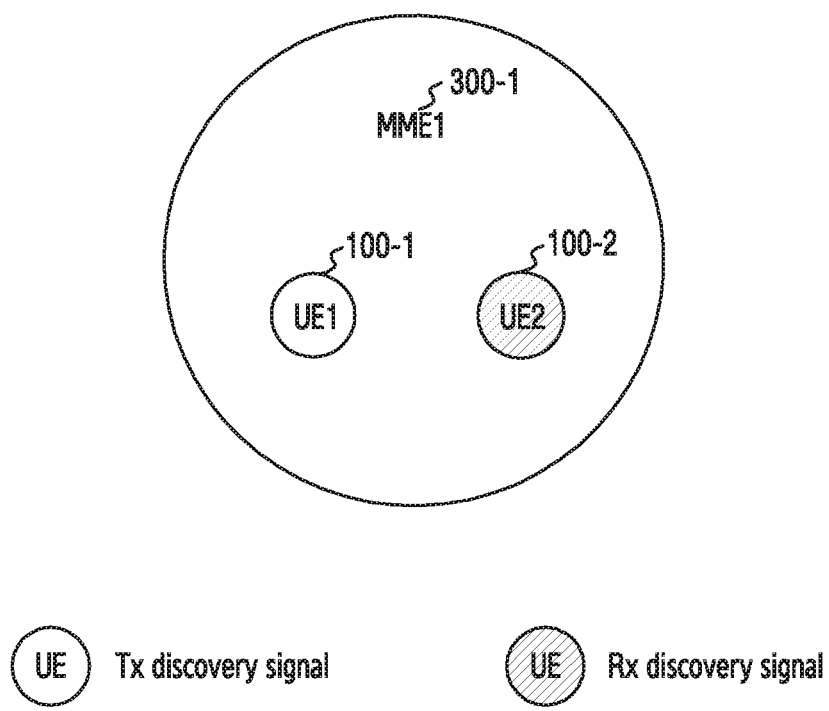
FIGS. 18A and 18B illustrate an embodiment in which the discovery server determines a multicast ID for a discovery procedure of two UEs pertaining to the same MME and informs of whether a conflict is generated or not.
Figure 18B:
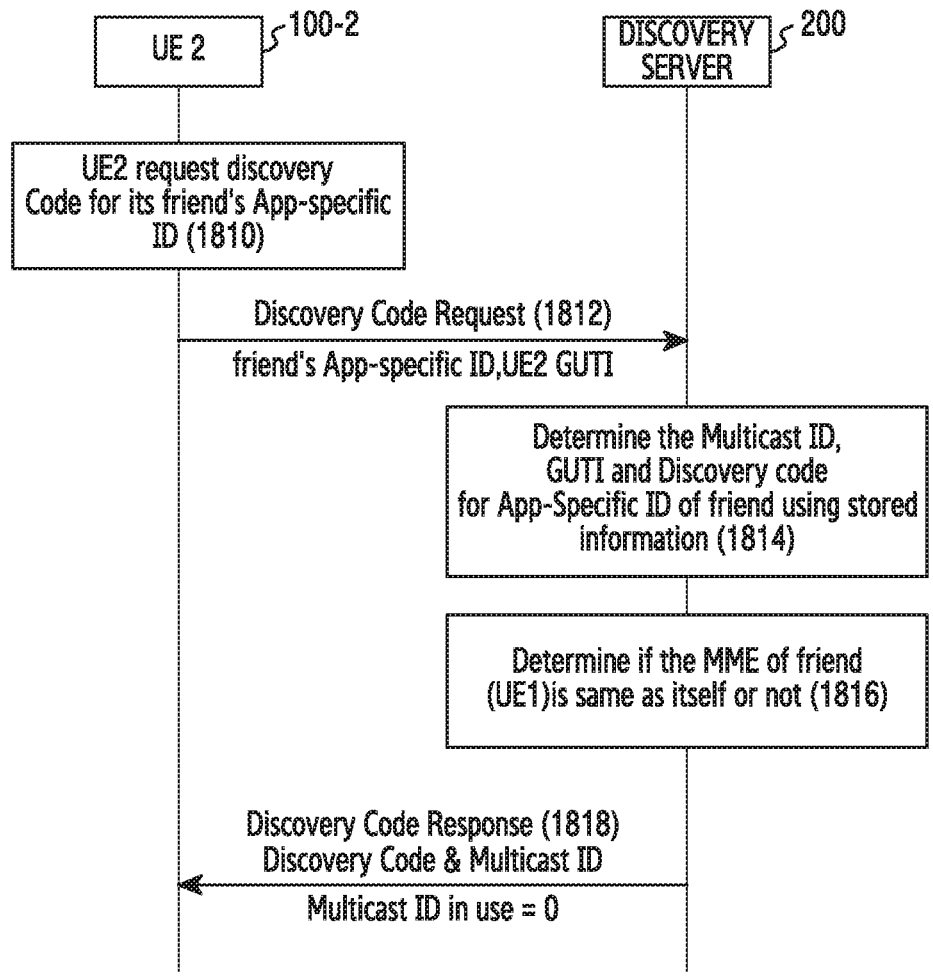

FIGS. 18A and 18B illustrate an embodiment in which the discovery server determines a multicast ID for a discovery procedure of two UEs pertaining to the same MME and informs of whether a multicast ID conflict is generated or not.

FIGS. 18A and 18B illustrate an embodiment of updating a multicast ID for a discovery procedure of two UEs pertaining to different MMEs.

As illustrated in FIG. 18A, it is assumed that UE #1 100-1 and UE #2 100-2 pertain to MME #1 300-1 in the present embodiment. Further, a procedure in which UE #2 100-2 acquires a multicast ID of UE #1 100-1 in order to receive a discovery signal from UE #1 100-1 will be described herein.

Referring to FIG. 18B, UE #2 100-2 determines to make a request for a discovery code of an App-specific ID of UE #1 100-1 in step 1810, and transmits a discovery code request signal including the App-specific ID of UE #1 100-1 and a GUTI, which is an ID of UE #2 100-2, to the discovery server 200 in step 1812.

The discovery server 200 may determine the multicast ID of UE #1 100-1, the GUTI, and the discovery code corresponding to the App-specific ID of UE #1 100-1 by using a pre-stored database in step 1814. Here, the pre-stored database may include a table of step 1718 generated by the operation illustrated in FIG. 17. Further, the discovery server 200 may configure the database by receiving in advance information on multicast IDs of UEs pertaining to the corresponding MME from the MME at a periodic time point or a particular event time point. Thereafter, the discovery server determines whether MMEs of UE #1 100-1 and UE #2 100-2 are the same in step 1816. Here, as illustrated in FIG. 18A, since it is assumed that the MMEs of UE #1 100-1 and UE #2 100-2 are the same, the discovery server 200 may determine that the MMEs of UE #1 100-1 and UE #2 100-2 are the same based on GUTI of UE #1 100-1 and UE #2 100-2.

When the MMEs of UE #1 100-1 and UE #2 100-2 are the same, the discovery server 200 transmits a discovery code response signal including the discovery code of UE #1 100-1, the multicast ID, and information indicating non-conflict of the multicast ID (for example, multicast ID in use=0) to UE #2 100-2 in step 1818. Here, the information indicating the non-conflict of the multicast ID may mean that other UEs except for UE #1 100-1 among UEs adjacent to UE #2 100-2 do not use the corresponding multicast ID and, accordingly a conflict problem is not generated even though UE #2 100-2 uses the multicast ID of UE #1 100-1 in order receive an additional discovery signal since UE #1 100-1 and UE #2 100-2 pertain to the same MME.

UE #2 100-2 may recognize the non-conflict of the multicast ID from the discovery code response signal, and receive additional discovery information of UE #1 100-1 by using the multicast ID included in the discovery code response signal.

Figure 19A:
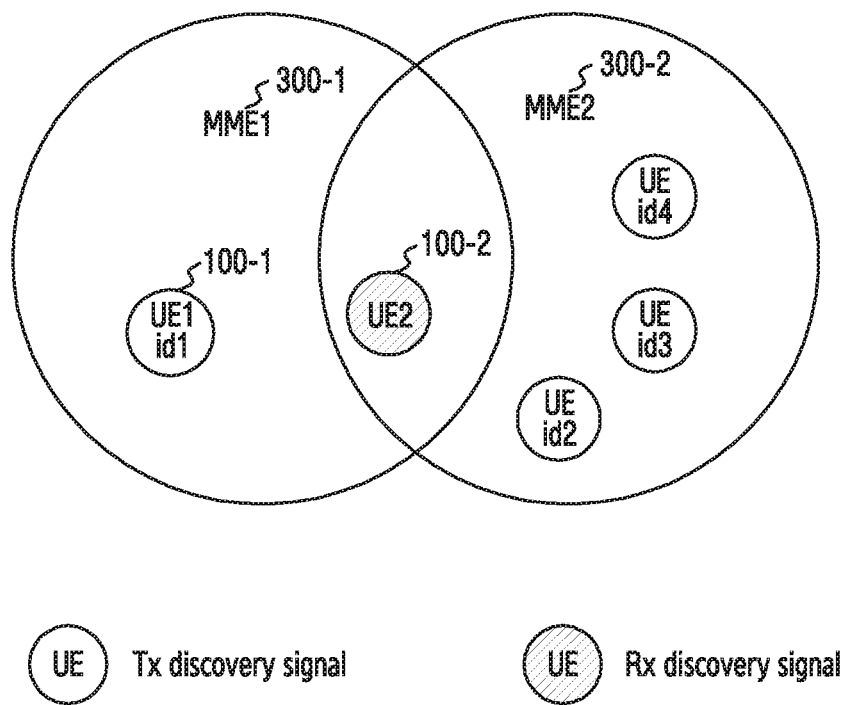
FIGS. 19A and 19B illustrate an embodiment in which the discovery server determines a multicast ID for a discovery procedure of two UEs pertaining to different MMEs and informs of whether a conflict is generated or not.
Figure 19B:
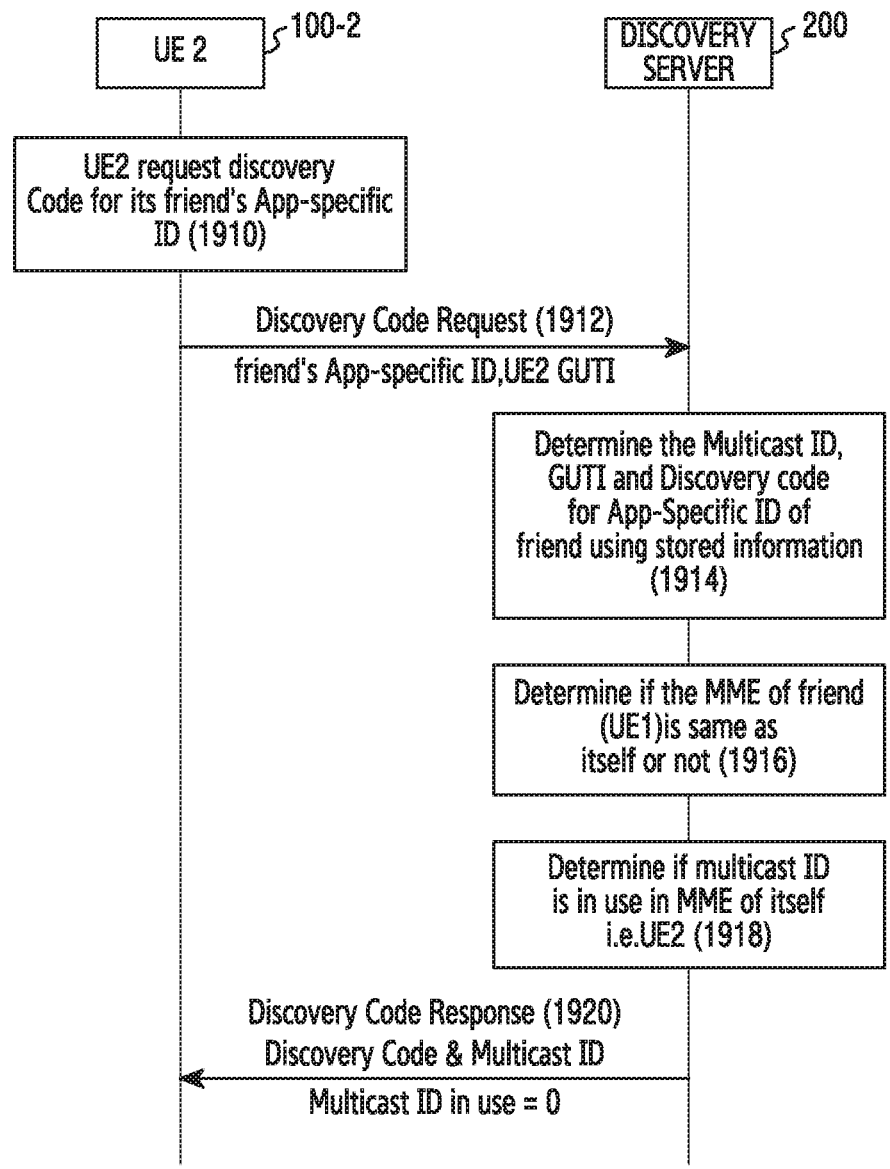

FIGS. 19A and 19B illustrate an embodiment in which the discovery server determines a multicast ID for a discovery procedure of two UEs pertaining to different MMEs and informs of whether a multicast ID conflict is generated or not.

As illustrated in FIG. 19A, it is assumed that UE #1 100-1 pertains to MME #1 300-1 and UE #2 100-2 is located in an overlapping area of MME #1 300-1 and MME #2 300-2 but pertains to MME #2 300-2 in the present embodiment. Further, a procedure in which UE #2 100-2 acquires a multicast ID of UE #1 100-1 in order to receive a discovery signal from UE #1 100-1 will be described herein.

Referring to FIG. 19B, UE #2 100-2 determines to make a request for a discovery code of an App-specific ID of UE #1 100-1 in step 1910, and transmits a discovery code request signal including the App-specific ID of UE #1 100-1 and a GUTI, which is an ID of UE #2 100-2, to the discovery server 200 in step 1912.

The discovery server 200 may search for and determine the multicast ID of UE #1 100-1, the GUTI, and the discovery code corresponding to the App-specific ID of UE #1 100-1 from a pre-stored database in step 1914. Here, the pre-stored database may include a table of step 1718 generated by the operation illustrated in FIG. 17. Further, the discovery server 200 may configure the database by receiving in advance information on multicast IDs of UEs pertaining to the corresponding MME from the MME at a periodic time point or a particular event time point. Thereafter, the discovery server 200 determines whether MMEs of UE #1 100-1 and UE #2 100-2 are the same in step 1916. Here, as illustrated in FIG. 19A, since it is assumed that the MMEs of UE #1 100-1 and UE #2 100-2 are different, the discovery server 200 may determine that the MMEs of UE #1 100-1 and UE #2 100-2 are different based on GUTI of UE #1 100-1 and UE #2 100-2.

When UE #1 100-1 pertains to MME #1 300-1 and UE #2 100-2 pertains to MME #2 300-2, the discovery server 200 checks whether a multicast ID of UE #1 100-1 overlaps a multicast ID used within MME #2 300-2 in step 1918. As illustrated in FIG. 19A, when the multicast ID of UE #1 100-1 is "id1" and there is no UE using "id1" within MME #2 300-2, the discovery server 200 may determine that the multicast ID of UE #1 100-1 does not overlap the multicast ID used within MME #2 300-2

When the multicast ID of UE #1 100-1 does not overlap the multicast ID used within MME #2 300-2, the discovery server 200 transmits a discovery code response signal including the discovery code of UE #1 100-1, the multicast ID, and information indicating non-conflict of the multicast ID (for example, multicast ID in use=0) to UE #2 100-2 in step 1920. Here, the information indicating the non-conflict of the multicast ID may mean that a conflict problem is not generated even though UE #2 100-2 uses the multicast ID of UE #1 100-1 in order receive an additional discovery signal since other UEs except for UE #1 100-1 among UEs adjacent to UE #2 100-2 do not use the corresponding multicast ID.

UE #2 100-2 may recognize the non-conflict of the multicast ID from the discovery code response signal, and receive additional discovery information of UE #1 100-1 by using the multicast ID included in the discovery code response signal.

Figure 20A:
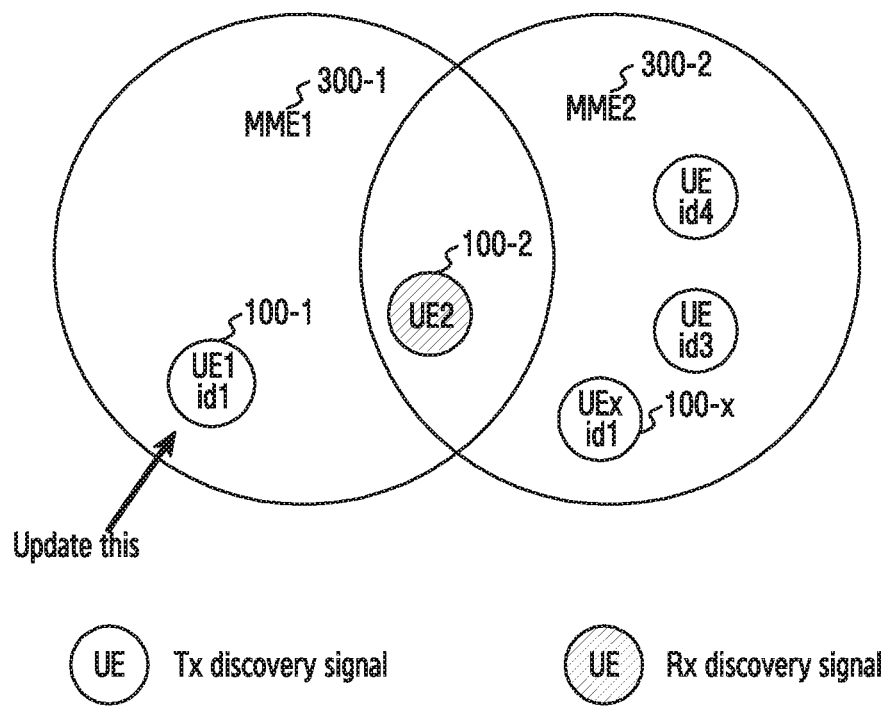
FIGS. 20A and 20B illustrates an embodiment of updating a multicast ID for a discovery procedure of two UEs pertaining to different MMEs in consideration of whether the multicast ID conflict is generated or not.
Figure 20B:
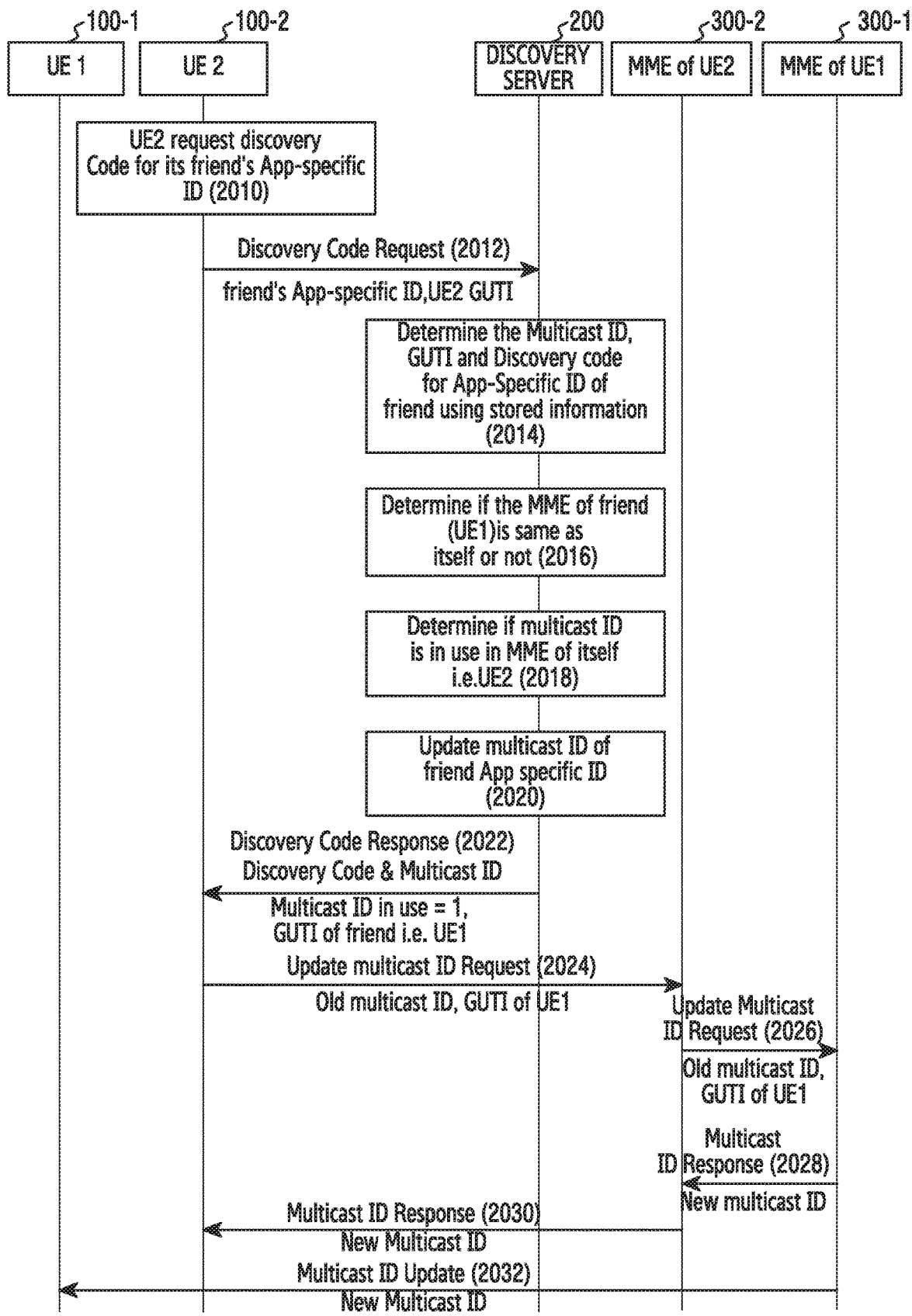

FIGS. 20A and 20B illustrates a signal flow of updating a multicast ID for a discovery procedure of two UEs pertaining to different MMEs in consideration of whether a multicast conflict is generated or not.

As illustrated in FIG. 20A, it is assumed that UE #1 100-1 pertains to MME #1 300-1 and UE #2 100-2 is located in an overlapping area of MME #1 300-1 and MME #2 300-2 but pertains to MME #2 300-2 in the present embodiment. Further, a procedure in which UE #2 100-2 acquires a multicast ID of UE #1 100-1 in order to receive a discovery signal from UE #1 100-1 will be described herein.

Referring to FIG. 20B, UE #2 100-2 determines to make a request for a discovery code of an App-specific ID of UE #1 100-1 in step 2010, and transmits a discovery code request signal including the App-specific ID of UE #1 100-1 and a GUTI, which is an ID of UE #2 100-2, to the discovery server 200 in step 2012.

The discovery server 200 may search for and determine the multicast ID of UE #1 100-1, the GUTI, and the discovery code corresponding to the App-specific ID of UE #1 100-1 from a pre-stored database in step 2014. Here, the pre-stored database may include a table of step 1718 generated by the operation illustrated in FIG. 17. Further, the discovery server 200 may configure the database by receiving in advance information on multicast IDs of UEs pertaining to the corresponding MME from the MME at a periodic time point or a particular event time point. Thereafter, the discovery server 200 determines whether MMEs of UE #1 100-1 and UE #2 100-2 are the same in step 2016. Here, as illustrated in FIG. 20A, since it is assumed that the MMEs of UE #1 100-1 and UE #2 100-2 are different, the discovery server 200 may determine that the MMEs of UE #1 100-1 and UE #2 100-2 are different based on GUTI of UE #1 100-1 and UE #2 100-2.

When UE #1 100-1 pertains to MME #1 300-1 and UE #2 100-2 pertains to MME #2 300-2, the discovery server 200 checks whether a multicast ID of UE #1 100-1 overlaps a multicast ID used within MME #2 300-2 in step 2018. As illustrated in FIG. 20A, when the multicast ID of UE #1 100-1 is "id1" and a particular UE 100-x uses "id1" within MME #2 300-2, the discovery server 200 may determine that the multicast ID of UE #1 100-1 overlaps the multicast ID used within MME #2 300-2.

When the multicast ID of UE #1 100-1 overlaps the multicast ID used within MME #2 300-2, the discovery server 200 recognizes that it is required to update the multicast ID of UE #1 100-1 in step 2020, and transmits a discovery code response signal including the discovery code of UE #1 100-1, the multicast ID, information indicating the conflict of the multicast ID (for example, multicast ID in use=1), and the GUTI of UE #1 100-1 to UE #2 100-2 in step 2022. Here, the information indicating the conflict of the multicast ID may mean that a conflict problem can be generated when UE #2 100-2 uses the multicast ID of UE #1 100-1 in order receive an additional discovery signal since other UEs except for UE #1 100-1 among UEs adjacent to UE #2 100-2 use the corresponding multicast ID.

UE #2 100-2 may recognize the conflict of the multicast ID from the discovery code response signal, and transmit a multicast ID update request signal including the multicast ID and the GUTI of UE #1 100-1 included in the discovery code response signal to MME #2 300-2 in step 2024.

MME #2 300-2 determines the corresponding MME based on the GUTI of UE #1 100-1 that requires to update the multicast ID in the multicast ID update request signal received from UE #2 100-2, and transfers the multicast ID update request signal to MME #1 300-1 to which UE #1 100-1 pertains in step 2026. MME #1 300-1 determines that it is required to update the multicast ID of UE #1 100-1 in the multicast ID update request signal received from MME #2 300-2 and allocates a new multicast ID to UE #1 100-1. At this time, MME #1 300-1 may collect multicast ID information used by UEs within MME #2 300-2 from MME #2 300-2 and allocate a multicast ID, which does not overlap multicast IDs of UEs within MME #2 300-2 and UEs within MME #1 300-1, to UE #1 100-1. MME #1 300-1 transmits a multicast ID response message including the new multicast ID allocated to UE #1 100-1 to MME #2 300-2 in step 2028. Thereafter, MME #2 300-2 transfers the received multicast ID response message to UE #1 100-1 and UE #2 100-2 in steps 2030 and 2032.

Accordingly, UE #1 100-1 may transmit a second discovery signal having the new multicast ID in the D2D multicast subframe, and UE #2 100-2 may receive a second discovery signal having the new multicast ID of UE #1 100-1 in the D2D multicast subframe.

Figure 21A:
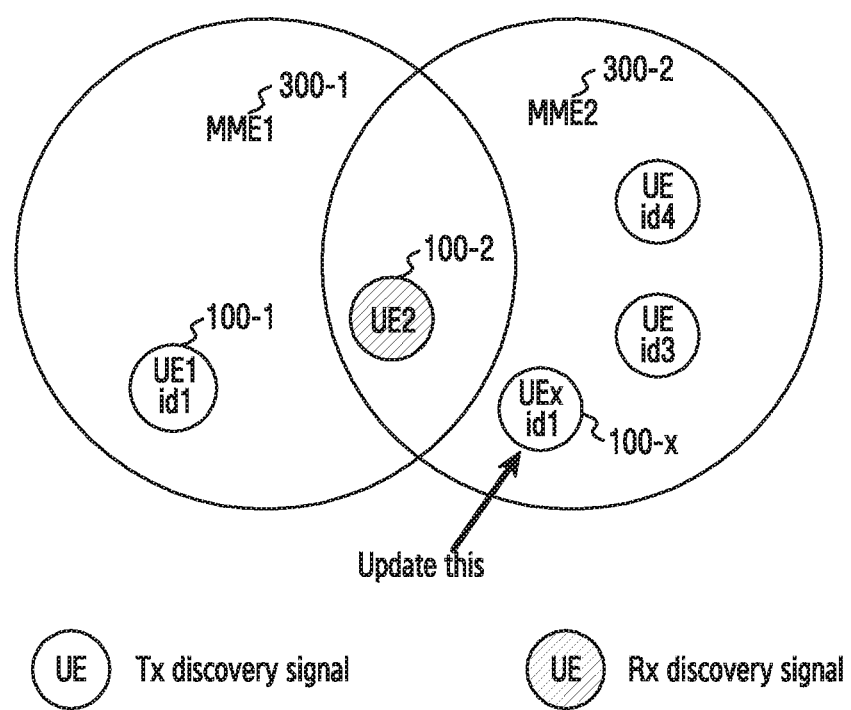
FIGS. 21A and 21B illustrates an embodiment of updating a multicast ID of another UE for a discovery procedure of two UEs pertaining to different MMEs in consideration of whether a multicast ID conflict is generated or not.
Figure 21B:
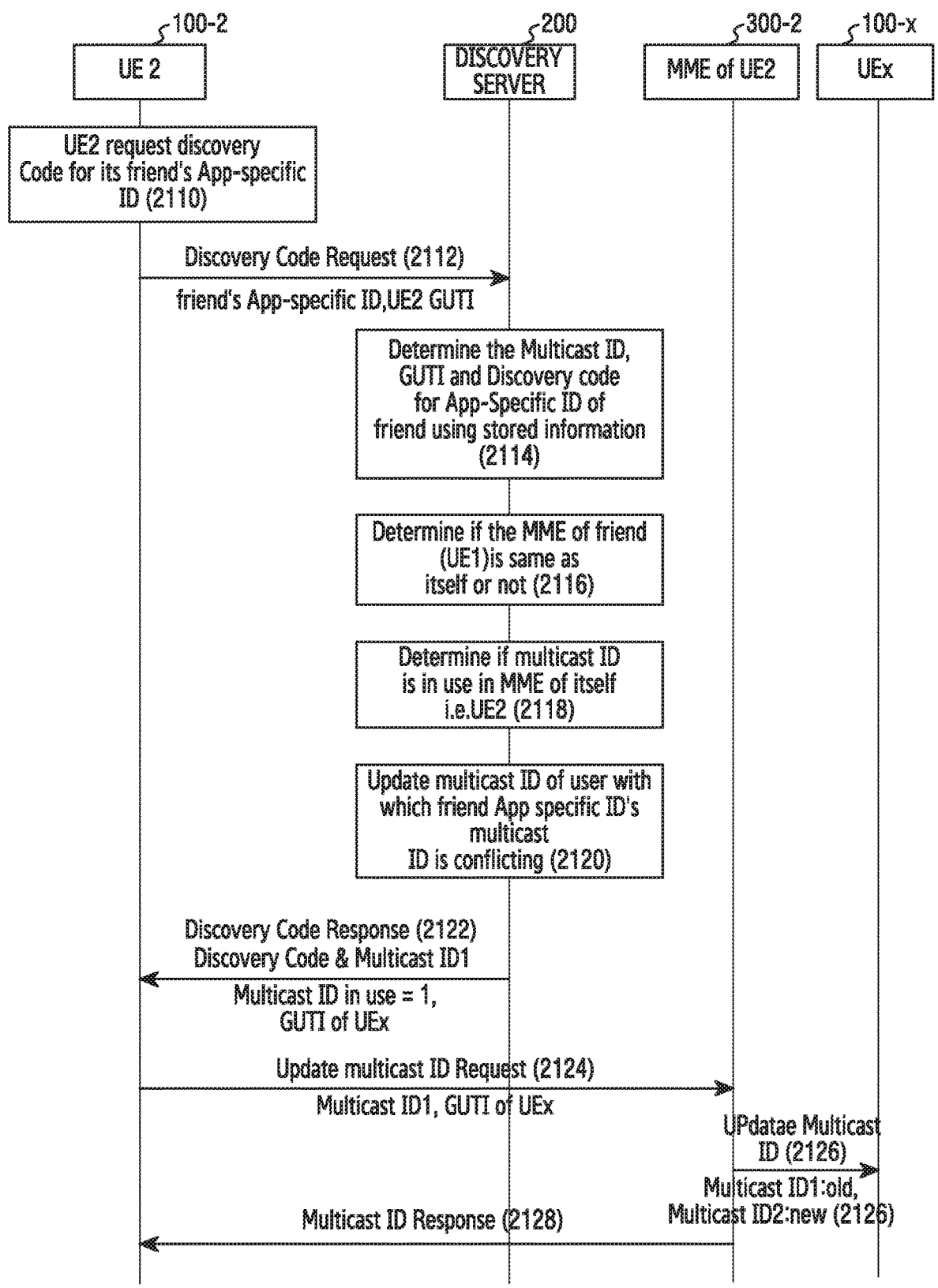

FIGS. 21A and 21B illustrates an embodiment of updating a multicast ID of another UE for a discovery procedure of two UEs pertaining to different MMEs in consideration of whether a multicast ID conflict is generated or not.

As illustrated in FIG. 21A, it is assumed that UE #1 100-1 pertains to MME #1 300-1 and UE #2 100-2 is located in an overlapping area of MME #1 300-1 and MME #2 300-2 but pertains to MME #2 300-2 in the present embodiment. Further, a procedure in which UE #2 100-2 acquires a multicast ID of UE #1 100-1 in order to receive a discovery signal from UE #1 100-1 will be described herein.

Referring to FIG. 21B, UE #2 100-2 determines to make a request for a discovery code for an App-specific ID of UE #1 100-1 in step 2110, and transmits a discovery code request signal including the App-specific ID of UE #1 100-1 and a GUTI, which is an ID of UE #2 100-2, to the discovery server 200 in step 2112.

The discovery server 200 may search for and determine the multicast ID of UE #1 100-1, the GUTI, and the discovery code corresponding to the App-specific ID of UE #1 100-1 from a pre-stored database in step 2114. Here, the pre-stored database may include a table of step 1718 generated by the operation illustrated in FIG. 17. Further, the discovery server 200 may configure the database by receiving information on multicast IDs of UEs pertaining to the corresponding MME from the MME at a periodic time point or a particular event time point. Thereafter, the discovery server 200 determines whether MMEs of UE #1 100-1 and UE #2 100-2 are the same in step 2116. Here, as illustrated in FIG. 21A, since it is assumed that the MMEs of UE #1 100-1 and UE #2 100-2 are different, the discovery server 200 may determine that the MMEs of UE #1 100-1 and UE #2 100-2 are different based on GUTI of UE #1 100-1 and UE #2 100-2.

When UE #1 100-1 pertains to MME #1 300-1 and UE #2 100-2 pertains to MME #2 300-2, the discovery server 200 checks whether a multicast ID of UE #1 100-1 overlaps a multicast ID used within MME #2 300-2 in step 2118. As illustrated in FIG. 21A, when the multicast ID of UE #1 100-1 is "id1" and a particular UE 100-x uses "id1" within MME #2 300-2, the discovery server 200 may determine that the multicast ID of UE #1 100-1 overlaps the multicast ID used within MME #2 300-2.

When the multicast ID of UE #1 100-1 overlaps the multicast ID used within MME #2 300-2, the discovery server 200 recognizes that it is required to update a multicast ID of a particular UE 100-x in step 2120, and transmits a discovery code response signal including the discovery code of UE #1 100-1, the multicast ID, information indicating the conflict of the multicast ID (for example, multicast ID in use=1), and the GUTI of the particular UE 100-x to UE #2 100-2 in step 2122. Here, the information indicating the conflict of the multicast ID may mean that a conflict problem can be generated when UE #2 100-2 uses the multicast ID of UE #1 100-1 in order receive an additional discovery signal since other UEs except for UE #1 100-1 among UEs adjacent to UE #2 100-2 use the corresponding multicast ID.

UE #2 100-2 may recognize the conflict of the multicast ID from the discovery code response signal, and transmit a multicast ID update request signal including the multicast ID and the GUTI of the particular UE 100-x included in the discovery code response signal to MME #2 300-2 in step 2024.

MME #2 300-2 determines that the corresponding MME is MME #2 300-2 itself based on the GUTI of the particular UE 100-x requiring the update of the multicast ID in the multicast ID update request signal received from UE #2

100-2 and allocates a new multicast ID to the particular UE 100-x. According to some embodiments, MME #2 300-2 may collect multicast ID information, which is being used by UEs within MME #1 300-1, from MME #1 300-1, and allocates a multicast ID, which does not overlap multicast IDs of UEs within MME #1 300-1 and UEs within MME #2 300-2, to the particular UE 100-x based on the collected multicast ID information. MME #2 300-2 transmits a signal informing the particular UE 100-x that the existing multicast ID has been changed to the new multicast ID. Thereafter, MME #2 300-2 transmits a multicast ID response message indicating the change in the multicast ID of the particular UE 100-x to UE #2 100-2 in step 2128.

Accordingly, UE #2 100-2 may receive a second discovery signal having the multicast ID of UE #1 100-1 in the D2D multicast subframe.

According to various embodiments of the present invention, a method of performing D2D communication by a UE may include a process of acquiring a discovery code and a multicast ID to be used for transmitting additional information on an application program through a D2D multicast subframe based on an ID of the UE for the application program, and a process of broadcasting the discovery code and the multicast ID in a discovery subframe.

According to various embodiments of the present invention, the method may further include a process of transmitting the additional information on the application program along with the multicast ID through the D2D multicast subframe.

According to various embodiments of the present invention, the process of transmitting the additional information on the application program may include, when at least two D2D multicast subframes having a second period exist between discovery subframes having a first period, a process of fragmenting the additional information on the application program into at least two pieces of information, and a process of transmitting the fragmented additional information through the at least two D2D multicast subframes.

According to various embodiments of the present invention, the method may further include a process of transmitting the additional information on the application program to an eNB, and the acquired multicast ID may be used for transmitting the additional information on the application program through the D2D multicast subframe by the eNB.

According to various embodiments of the present invention, the process of acquiring the discovery code and the multicast ID may include a process of transmitting the ID of the UE for the application program to a discovery server and a process of receiving the discovery code and the multicast ID from the discovery server.

According to various embodiments of the present invention, the process of acquiring the discovery code and the multicast ID may include a process of generating a discovery code corresponding to the ID for the application program based on a rule pre-stored in the UE and a process of determining the multicast ID of the UE through a negotiation procedure with another UE.

According to various embodiments of the present invention, the process of acquiring the multicast ID may include a process of transmitting a Global Unique Temporary ID (GUTI) of the UE to a discovery server and a process of receiving a multicast ID determined based on the GUTI, wherein the GUTI may include a GUMMEI (Globally Unique MME ID) indicating a MME, to which the UE pertains, and an M-TMSI (MME-Temporary Mobile Subscriber ID) corresponding to identification information for identifying the UE within the MME to which the UE pertains.

According to various embodiments of the present invention, a method of performing D2D communication by a UE may include a process of receiving a discovery code and a multicast ID of a transmission UE, a process of determining whether to receive additional information of the transmission UE based on the received discovery code, and, when it is determined that reception of the additional information will take place, a process of receiving additional information having the multicast ID received through a D2D multicast subframe.

According to various embodiments of the present invention, the process of receiving the discovery code and the multicast ID of the transmission UE may include a process of receiving the discovery code and the multicast ID through a discovery subframe.

According to various embodiments of the present invention, the process of receiving the discovery code and the multicast ID of the transmission UE may include a process of transmitting an ID of the transmission UE for an application program and a Global Unique Temporary ID (GUTI) of the UE to a discovery server and a process of receiving the discovery code and the multicast ID of the transmission UE from the discovery server.

According to various embodiments of the present invention, the process of receiving of the discovery code and the multicast ID of the transmission UE from the discovery server may include a process of receiving, from the discovery server, information indicating whether the multicast ID conflicts or not, and, when the information indicating whether the multicast ID conflicts indicates non-conflict of the multicast ID, a process of determining to use the received multicast ID.

According to various embodiments of the present invention, when the information indicating whether the multicast ID conflicts or not indicates conflict of the multicast ID, the method may include a process of updating the multicast ID of the transmission UE through communication with one of an MME of the transmission UE and an MME of the UE or updating a multicast ID of another UE using a multicast ID identical to that of the transmission UE.

According to various embodiments of the present invention, the process of determining whether to receive the additional information of the transmission UE based on the received discovery code may include a process of comparing a discovery code for a UE ID of an application program pre-stored in the UE with the received discovery code, a process of determining to receive the additional information of the transmission UE when the discovery code identical to the received discovery code based on a result of the comparison exists, and a process of determining to not receive the additional information of the transmission UE when there is no discovery code identical to the received discovery code.

According to various embodiments of the present invention, a method of performing D2D communication by a discovery server may include a process of receiving an ID of a UE for an application program, a process of determining a discovery code corresponding to the ID for the application program, and a process of transmitting the discovery code and a multicast ID of the UE to the UE, wherein the multicast ID of the UE may be used for transmitting additional information on the application program through a D2D multicast subframe.

According to various embodiments of the present invention, the method may further include a process of acquiring a GUTI of the UE from the UE, wherein the multicast ID of the UE may identify a Mobile Management Entity (MME), to which the UE pertains, based on a GUTI of the UE and is acquired through communication with the identified MME, and the GUTI may include a GUMMEI (Globally Unique MME ID) indicating a MME, to which the UE pertains, and an M-TMSI (MME-Temporary Mobile Subscriber ID) corresponding to identification information for identifying the UE within the MME to which the UE pertains.

According to various embodiments of the present invention, the process of receiving the ID of the UE for the application program may include a process of receiving an ID of a second UE for the application program and a GUTI of a first UE from the first UE, the process of determining the discovery code corresponding to the ID for the application program may include a process of searching for a multicast ID, a GUTI, and a discovery code of the second UE in a database pre-stored in the discovery server based on the ID of the second UE for the application program, a process of determining whether the first UE and the second UE pertain an identical MME based on the GUTI of the first UE and the GUTI of the second UE, and, when the first UE and the second UE pertain to the identical MME, a process of determining to transmit the discovery code and the multicast ID of the second UE to the first UE According to various embodiments of the present invention, the process of determining a discovery code corresponding to the ID for the application program may further include, when the first UE and the second UE pertain to different MMEs, a process of checking whether the multicast ID of the second UE is used in the MME of the first UE, and, when the multicast ID of the second UE is not used in the MME of the first UE, a process of determining to transmit the discovery code and the multicast ID of the second UE to the first UE.

According to various embodiments of the present invention, the process of determining the discovery code corresponding to the ID for the application program may further include, when the multicast ID of the second UE is used in the MME of the first UE, a process of updating the multicast ID of the first UE through communication with the MME of the first UE and the MME of the second UE or updating a multicast ID of another UE having the multicast ID identical to that of the first UE.

According to various embodiments of the present invention, the process of transmitting the discovery code and the multicast ID of the UE to the UE may include a process of also transmitting at least one of information indicating whether the multicast ID of the UE conflicts and a GUTI of the UE requiring a multicast ID update when transmitting the discovery code and the multicast ID of the UE.

According to various embodiments of the present invention, a method of performing D2D communication by a Mobile Management Entity (MME) may include a process of receiving a request for transmitting a multicast ID of a UE from one of a discovery server and the UE, a process of determining the multicast ID of the UE to not overlap multicast IDs of other UEs within the MME, and a process of transmitting the determined multicast ID to one of the discovery server and the UE.

According to various embodiments of the present invention, an apparatus of a UE for D2D communication may include a communication unit for transmitting/receiving a signal, and a controller for acquiring a discovery code and a multicast ID to be used for transmitting additional information on an application program through a D2D multicast subframe based on an ID of the UE for the application program and broadcasting the discovery code and the multicast ID in a discovery subframe.

According to various embodiments of the present invention, the controller may control a function for transmitting the additional information on the application program along with the multicast ID through the D2D multicast subframe by controlling the communication unit.

According to various embodiments of the present invention, the controller may control a function for, when at least two D2D multicast subframes having a second period exist between discovery subframes having a first period, fragmenting the additional information on the application program into at least two pieces of information and transmitting the fragmented additional information through the at least two D2D multicast subframes.

According to various embodiments of the present invention, the controller may control a function for transmitting the additional information on the application program to an eNB, and the acquired multicast ID may be used for transmitting the additional information on the application program through the D2D multicast subframe by the eNB.

According to various embodiments of the present invention, the controller may control a function for transmitting the ID of the UE for the application program to a discovery server and receiving the discovery code and the multicast ID from the discovery server.

According to various embodiments of the present invention, the controller may generate a discovery code corresponding to the ID for the application program based on a rule pre-stored in the UE and determine the multicast ID of the UE through a negotiation procedure with another UE.

According to various embodiments of the present invention, the controller may make a control to transmit a Global Unique Temporary ID (GUTI) of the UE to a discovery server and to receive a multicast ID determined based on the GUTI, wherein the GUTI may include a GUMMEI (Globally Unique MME ID) indicating a Mobile Management Entity (MME), to which the UE pertains, and an M-TMSI (MME-Temporary Mobile Subscriber ID) corresponding to identification information for identifying the UE within the MME to which the UE pertains.

According to various embodiments of the present invention, an apparatus of a UE for D2D communication may include a communication unit for transmitting/receiving a signal, and a controller for controlling a function for receiving a discovery code and a multicast ID of a transmission UE, determining whether to receive additional information of the transmission UE based on the received discovery code, and, when it is determined that reception of the additional information will take place, receiving additional information having the multicast ID received through a D2D multicast subframe.

According to various embodiments of the present invention, the controller may control a function for receiving the discovery code and the multicast ID through a discovery subframe.

According to various embodiments of the present invention, the controller may control a function for transmitting the ID of the transmission UE for the application program and a Global Unique Temporary ID (GUTI) of the UE to a discovery server and receiving the discovery code and the multicast ID of the transmission UE from the discovery server.

According to various embodiments of the present invention, the controller may control a function for receiving, the discovery server, information indicating whether the multicast ID conflicts or not and, when the information indicating whether the multicast ID conflicts or not indicates non-conflict of the multicast ID, determining to use the received multicast ID.

According to various embodiments of the present invention, when the information indicating whether the multicast ID conflicts or not indicates conflict of the multicast ID, the controller may control a function for updating the multicast ID of the transmission UE through communication with one of an MME of the transmission UE and an MME of the UE or updating a multicast ID of another UE using a multicast ID identical to that of the transmission UE.

According to various embodiments of the present invention, the controller may control a function for comparing a discovery code for a UE ID of an application program pre-stored in the UE with the received discovery code, determining to receive the additional information of the transmission UE when the discovery code identical to the received discovery code based on a result of the comparison exists, and determining to not receive the additional information of the transmission UE when there is no discovery code identical to the received discovery code.

According to various embodiments of the present invention, an apparatus of a discovery server for D2D communication may include a communication unit for transmitting/receiving a signal, and controls a function for receiving an ID of a UE for an application program, determining a discovery code corresponding to the ID for the application program, and transmitting the discovery code and a multicast ID of the UE to the UE, wherein the multicast ID of the UE may be used for transmitting additional information on the application program through a D2D multicast subframe.

According to various embodiments of the present invention, the controller may control a function for acquiring a GUTI of the UE from the UE, wherein the multicast ID of the UE may identify a Mobile Management Entity (MME), to which the UE pertains, based on a GUTI of the UE and is acquired through communication with the identified MME, and the GUTI may include a GUMMEI (Globally Unique MME ID) indicating a Mobile Management Entity (MME), to which the UE pertains, and an M-TMSI (MME-Temporary Mobile Subscriber ID) corresponding to identification information for identifying the UE within the MME to which the UE pertains.

According to various embodiments of the present invention, the controller may control a function for receiving an ID of a second UE for the application program and a GUTI of a first UE from the first UE, searching for a multicast ID, a GUTI, and a discovery code of the second UE in a database pre-stored in the discovery server based on the ID of the second UE for the application program, determining whether the first UE and the second UE pertain an identical MME based on the GUTI of the first UE and the GUTI of the second UE, and, when the first UE and the second UE pertain to the identical MME, determining to transmit the discovery code and the multicast ID of the second UE to the first UE According to various embodiments of the present invention, when the first UE and the second UE pertain to different MMEs, the controller may check whether the multicast ID of the second UE is used in the MME of the first UE, and, when the multicast ID of the second UE is not used in the MME of the first UE, determine to transmit the discovery code and the multicast ID of the second UE to the first UE.

According to various embodiments of the present invention, when the multicast ID of the second UE is used in the MME of the first UE, the controller may update the multicast ID of the first UE through communication with the MME of the first UE and the MME of the second UE or update a multicast ID of another UE having the multicast ID identical to that of the first UE.

According to various embodiments of the present invention, the controller may control a function for also transmitting at least one of information indicating whether the multicast ID of the UE conflicts and a GUTI of the UE requiring a multicast ID update when transmitting the discovery code and the multicast ID of the UE.

According to various embodiments of the present invention, an apparatus of a Mobile Management Entity (MME) for D2D communication may include a communication unit for transmitting/receiving a signal, and a controller for controlling a function for receiving a request for transmitting a multicast ID of a UE from one of a discovery server and the UE, determining the multicast ID of the UE to not overlap multicast IDs of other UEs within the MME, and transmitting the determined multicast ID to one of the discovery server and the UE.

Although the present invention has been described by the restricted embodiments and the drawings as described above, the present invention is not limited to the aforementioned embodiments and various modifications and alterations can be made from the descriptions by those skilled in the art to which the present invention pertains.

Operations according to an embodiment of the present invention may be implemented by a single controller. In this case, a program instruction for performing an operation implemented by various computers may be recorded in a computer-readable medium. The computer readable medium may include a program command, a data file, a data structure, and the like independently or in combination. The program command may be things specially designed and configured for the present invention, or things that are well known to and can be used by those skilled in the related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Further, the program command includes a machine language code generated by a compiler and a high-level language code executable by a computer through an interpreter and the like. When some or all of base stations or relays described in the present invention are implemented by a computer program, a computer-readable recording medium which has stored the computer program is also included in the present invention. Therefore, the scope of the present invention should not be defined as being limited to the embodiments, but should be defined by the appended claims and equivalents thereof.

What is claimed is:

1. A method for operating a first user equipment (UE) performing device-to-device (D2D) communication, the method comprising:
acquiring a discovery code corresponding to an identifier (ID) of an application program installed in the first UE;
acquiring a multicast ID to be used for transmitting additional discovery information on the application program;

broadcasting the discovery code and the multicast ID in a discovery subframe; and transmitting, to a second UE, the additional discovery information on the application program through a D2D multicast subframe by using the multicast ID.

2. The method of claim 1, wherein the transmitting of the additional information on the application program comprises:

when at least two D2D multicast subframes having a second period exist between discovery subframes having a first period, fragmenting the additional information on the application program into at least two pieces of information; and transmitting the fragmented additional information through the at least two D2D multicast subframes, and the acquired multicast ID is used for transmitting the additional information on the application program through the D2D multicast subframe by an eNB.

3. The method of claim 1, wherein the acquiring of the discovery code and the multicast ID comprises:

transmitting the ID of the application program for the first UE to a discovery server and receiving the discovery code and the multicast ID from the discovery server; or generating the discovery code corresponding to the ID of the application program based on a rule pre-stored in the first UE and determining the multicast ID of the first UE through a negotiation procedure with another UE.

4. The method of claim 1, wherein the acquiring of the multicast ID comprises:

transmitting a global unique temporary ID (GUTI) of the first UE to a discovery server; and receiving the multicast ID determined based on the GUTI, wherein the GUTI includes a globally unique mobile management entity ID (GUMMEI) indicating a mobility management entity (MME), to which the first UE pertains, and an MME temporary mobile subscriber ID (M-TMSI) corresponding to identification information for identifying the first UE within the MME to which the first UE pertains.

5. A method for operating a second user equipment (UE) performing device-to-device (D2D) communication, the method comprising:

receiving, from a first UE, a discovery code and a multicast identifier (ID), through a discovery subframe, the discovery code acquired corresponding to an ID of an application program installed in the first UE;

determining whether to receive additional information on the application program from the first UE based on the received discovery code; and when it is determined that reception of the additional information will take place, receiving the additional information using the multicast ID through a D2D multicast subframe.

6. The method of claim 5, wherein the receiving of the discovery code and the multicast ID of the first UE comprises:

transmitting an ID of an application program for the second UE and a global unique temporary ID (GUTI) of the second UE to a discovery server; and receiving the discovery code and the multicast ID of the first UE from the discovery server through a discovery subframe, and wherein the receiving of the discovery code and the multicast ID of the first UE comprises:

receiving, from the discovery server, information indicating whether the multicast ID conflicts or not;

when the information indicating whether the multicast ID conflicts indicates non-conflict of the multicast ID, determining to use the received multicast ID; and when the information indicating whether the multicast ID conflicts or not indicates conflict of the multicast ID, updating the multicast ID of the first UE through communication with one of a mobility management entity (MME) of the first UE and an MME of the second UE or updating a multicast ID of another UE using a multicast ID identical to that of the first UE.

7. The method of claim 5, wherein the determining of whether to receive the additional information of the first UE based on the received discovery code comprises:

comparing a discovery code corresponding to an application program for the second UE pre-stored in the second UE with the received discovery code; and determining to receive the additional information from the first UE when the discovery code identical to the received discovery code based on a result of the comparison exists, and determining to not receive the additional information from the first UE when there is no discovery code identical to the received discovery code.

8. A method for operating a discovery server, the method comprising:

receiving, from a first user equipment (UE), an identifier (ID) of an application program for the first UE;

determining a discovery code corresponding to the ID of the application program installed in the first UE; and transmitting, to the first UE, the discovery code and a multicast ID of the first UE, wherein the multicast ID of the first UE is used for transmitting additional information on the application program through a device-to-device (D2D) multicast subframe.

9. The method of claim 8, further comprising acquiring a global unique temporary ID (GUTI) of the first UE from the first UE, wherein the multicast ID of the first UE identifies a mobility management entity (MME), to which the first UE pertains, based on the GUTI of the first UE and is acquired through communication with the identified MME, and the GUTI includes a globally unique ME ID (GUMMEI) indicating the ME, to which the first UE pertains, and a MME-temporary mobile subscriber ID (M-TMSI) corresponding to identification information for identifying the first UE within the MME to which the first UE pertains.

10. The method of claim 8, wherein the receiving of the ID of the application program for the first UE comprises receiving an ID of an application program for a second UE and a global unique temporary ID (GUTI) of the first UE from the first UE, and wherein the determining of the discovery code corresponding to the ID of the application program comprises:

searching for a multicast ID, a GUTI, and a discovery code of the second UE in a database pre-stored in the discovery server based on the ID of the application program for the second UE;

determining whether the first UE and the second UE pertain an identical MME based on the GUTI of the first UE and the GUTI of the second UE; and when the first UE and the second UE pertain to the identical MME, determining to transmit the discovery code and the multicast ID of the second UE to the first UE, or wherein the determining of the discovery code corresponding to the ID of the application program comprises:

when the first UE and the second UE pertain to different MMEs, checking whether the multicast ID of the second UE is used in the MME of the first UE;

when the multicast ID of the second UE is not used in the MME of the first UE, determining to transmit the discovery code and the multicast ID of the second UE to the first UE; and when the multicast ID of the second UE is used in the MME of the first UE, updating the multicast ID of the first UE through communication with the MME of the first UE and the MME of the second UE or updating a multicast ID of another UE having the multicast ID identical to that of the first UE.

11. A first user equipment (UE) performing device-to-device (D2D) communication, the first UE comprising:
a transceiver configured to transmit/receive a signal; and
at least one processor configured to:
acquire a discovery code corresponding to an identifier (ID) of an application program installed in the first UE,
acquire a multicast ID to be used for transmitting additional discovery information on the application program,
broadcast the discovery code and the multicast ID in a discovery subframe, and
transmit, to a second UE, the additional information on the application program through a D2D multicast subframe using the multicast ID.

12. The first UE of claim 11, wherein the at least one processor is further configured to:
when at least two D2D multicast subframes having a second period exist between discovery subframes having a first period, fragment the additional information on the application program into at least two pieces of information, and
transmit the fragmented additional information through the at least two D2D multicast subframes,
wherein the acquired multicast ID is used for transmitting the additional information on the application program through the D2D multicast subframe by an eNB.

13. The first UE of claim 11, wherein the at least one processor is further configured to:
transmit the ID of the application program for the first UE to a discovery server and receiving the discovery code and the multicast ID from the discovery server, or
generate the discovery code corresponding to the ID of the application program based on a rule pre-stored in the first UE and determining the multicast ID of the first UE through a negotiation procedure with another UE.

14. The first UE of claim 11, wherein the at least one processor is further configured to:
transmit a global unique temporary ID (GUTI) of the first UE to a discovery server, and
receive the multicast ID determined based on the GUTI, wherein the GUTI includes a globally unique mobility management entity (MME) ID (GUMMEI) indicating a mobility management entity (MME), to which the first UE pertains, and an MME-temporary mobile subscriber ID (M-TMSI) corresponding to identification information for identifying the first UE within the MME to which the first UE pertains.

15. A second user equipment (UE) performing D2D (device-to-device) communication, the second UE comprising:
a transceiver configured to transmit/receive a signal; and
at least one processor configured to:
receive, from a first UE, a discovery code and a multicast identifier (ID), through a discovery subframe, the discovery code acquired corresponding to an ID of an application program installed in the first UE,
determine whether to receive additional information on the application program from the first UE based on the received discovery code, and
when it is determined that reception of the additional information will take place, receive the additional information using the multicast ID through a D2D multicast subframe.

16. The second UE of claim 15, wherein the at least one processor is further configured to:
transmit an ID of an application program for the second UE and a global unique temporary ID (GUTI) of the second UE to a discovery server,
receive, from the discovery server, information indicating whether the multicast ID conflicts or not,
when the information indicating whether the multicast ID conflicts indicates non-conflict of the multicast ID, determine to use the received multicast ID, and
when the information indicating whether the multicast ID conflicts or not indicates conflict of the multicast ID, update the multicast ID of the first UE through communication with one of a mobility management entity (MME) of the first UE and an MME of the second UE or update a multicast ID of another UE using a multicast ID identical to that of the first UE.

17. The second UE of claim 15, wherein the at least one processor is further configured to:
compare a discovery code corresponding to an application program for the second UE pre-stored in the second UE with the received discovery code,
determine to receive the additional information from the first UE when the discovery code identical to the received discovery code based on a result of the comparison exists, and
determine to not receive the additional information from the first UE when there is no discovery code identical to the received discovery code.

18. A discovery server comprising:
a transceiver configured to transmit/receive a signal; and
at least one processor configured to:
receive, from a first user equipment (UE), an identifier (ID) of an application program for the first UE,
determine a discovery code corresponding to the ID of the application program installed in the first UE, and
transmit, to the first UE, the discovery code and a multicast ID of the first UE,
wherein the multicast ID of the first UE is used for transmitting additional information on the application program through a device-to-device (D2D) multicast subframe.

19. The discovery server of claim 18,
wherein the at least one processor is further configured to acquire a global unique temporary ID (GUTI) of the first UE from the first UE,
wherein the multicast ID of the first UE identifies a mobility management entity (MME), to which the first UE pertains, based on a GUTI of the first UE and is acquired through communication with the identified MME, and wherein the GUTI includes a globally unique MME ID (GUMMEI) indicating the MME, to which the first UE pertains, and an MME-temporary mobile subscriber ID (M-TMSI) corresponding to identification information for identifying the first UE within the MME to which the first UE pertains.

20. The discovery server of claim 18, wherein the at least one processor is further configured to:

receive an ID of an application program for a second UE and a global unique temporary ID (GUTI) of the first UE from the first UE, search for a multicast ID, a GUTI, and a discovery code of the second UE in a database pre-stored in the discovery server based on the ID of the application program for the second UE, determine whether the first UE and the second UE pertain to an identical mobility management entity (MME) based on the GUTI of the first UE and the GUTI of the second UE, when the first UE and the second UE pertain to the identical MME, determine to transmit the discovery code and the multicast ID of the second UE to the first UE, or when the first UE and the second UE pertain to different MMEs, check whether the multicast ID of the second UE is used in the MME of the first UE, when the multicast ID of the second UE is not used in the MME of the first UE, determine to transmit the discovery code and the multicast ID of the second UE to the first UE, and when the multicast ID of the second UE is used in the MME of the first UE, update the multicast ID of the first UE through communication with the MME of the first UE and the MME of the second UE or update a multicast ID of another UE having the multicast ID identical to that of the first UE.

* * * * *